US010094927B2

(12) United States Patent
Send et al.

(10) Patent No.: US 10,094,927 B2
(45) Date of Patent: Oct. 9, 2018

(54) DETECTOR FOR OPTICALLY DETERMINING A POSITION OF AT LEAST ONE OBJECT

(71) Applicant: BASF SE, Ludwigshafen (DE)

(72) Inventors: Robert Send, Karlsruhe (DE); Ingmar Bruder, Neuleiningen (DE); Stephan Irle, Siegen (DE); Erwin Thiel, Siegen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/514,830

(22) PCT Filed: Sep. 28, 2015

(86) PCT No.: PCT/IB2015/057412
§ 371 (c)(1),
(2) Date: Mar. 28, 2017

(87) PCT Pub. No.: WO2016/051323
PCT Pub. Date: Apr. 7, 2016

(65) Prior Publication Data
US 2017/0219709 A1   Aug. 3, 2017

(30) Foreign Application Priority Data

Sep. 29, 2014 (EP) .................................. 14186792
Sep. 7, 2015 (EP) .................................. 15184069

(51) Int. Cl.
*G01B 11/14* (2006.01)
*G01S 17/42* (2006.01)
(Continued)

(52) U.S. Cl.
CPC ............ *G01S 17/42* (2013.01); *G01S 7/4816* (2013.01); *G01S 7/51* (2013.01)

(58) Field of Classification Search
CPC ......... G01C 3/08; G01S 17/42; G01S 13/865; G01S 13/867; G01S 17/105;
(Continued)

(56) References Cited

U.S. PATENT DOCUMENTS 3,035,176 A   5/1962   Kis et al.
3,112,197 A   11/1963  Neugebauer et al.
(Continued)

FOREIGN PATENT DOCUMENTS

CA   1065054   10/1979
CA   2196563   12/1996
(Continued)

OTHER PUBLICATIONS

International Search Report and Written Opinion dated Jan. 18, 2016 in PCT/IB2015/057412 filed Sep. 28, 2015.
(Continued)

*Primary Examiner* — Tri T Ton
(74) *Attorney, Agent, or Firm* — Oblon, McClelland, Maier & Neustadt, L.L.P.

(57) ABSTRACT

A detector (110) and a method for optically determining a position of at least one object (112). The detector (110) comprises at least one optical sensor (114) for determining a position of at least one light beam (134) and at least one evaluation device (164) for generating at least one item of information on a transversal position of the object (112) and at least one item of information on a longitudinal position of the object (112). The sensor (114) has at least a first electrode (126) and a second electrode (128). At least one photovoltaic material (130) is embedded in between the first electrode (126) and the second electrode (128). The first electrode (126) or the second electrode (128) is a split electrode (136) having at least three partial electrodes (140, 142, 144, 146).
(Continued)

The detector and the method can determine three-dimensional coordinates of an object in a fast and efficient way.

26 Claims, 4 Drawing Sheets

(51) Int. Cl.
  *G01S 7/481* (2006.01)
  *G01S 7/51* (2006.01)
(58) Field of Classification Search
  CPC ........ G01S 17/107; G01S 17/48; G01S 17/58;
           G01S 17/89; G01S 7/4816; G01S 7/51;
           A63B 2024/0025; A63B 2024/0028;
                                            A63B 2024/004
  USPC .................................................. 356/614–624
  See application file for complete search history.

(56) References Cited

U.S. PATENT DOCUMENTS

| | | |
|---|---|---|
| 3,384,752 A | 5/1968 | Odone |
| 3,562,785 A | 2/1971 | Craig |
| 3,937,950 A | 2/1976 | Hosoe et al. |
| 3,954,340 A | 5/1976 | Blomqvist et al. |
| 4,023,033 A | 5/1977 | Bricot et al. |
| 4,053,240 A | 10/1977 | Aizawa et al. |
| 4,079,247 A | 3/1978 | Bricot et al. |
| 4,256,513 A | 3/1981 | Yoshida et al. |
| 4,286,035 A | 8/1981 | Nishizima et al. |
| 4,469,945 A | 9/1984 | Hoeberechts et al. |
| 4,524,276 A | 6/1985 | Ohtombe |
| 4,565,761 A | 1/1986 | Katagiri et al. |
| 4,593,187 A | 6/1986 | Grotts et al. |
| 4,603,258 A | 7/1986 | Sher et al. |
| 4,647,193 A | 3/1987 | Rosenfeld |
| 4,675,535 A | 6/1987 | Tsunekawa et al. |
| 4,694,172 A | 9/1987 | Powell et al. |
| 4,760,004 A | 7/1988 | Rochat et al. |
| 4,760,151 A | 7/1988 | Rochat et al. |
| 4,767,211 A | 8/1988 | Munakata et al. |
| 4,773,751 A | 9/1988 | Matsuda et al. |
| 4,927,721 A | 5/1990 | Gratzel et al. |
| 4,952,472 A | 8/1990 | Baranyi et al. |
| 5,082,363 A | 1/1992 | Nakanishi et al. |
| 5,216,476 A | 6/1993 | Lanckton |
| 5,350,644 A | 9/1994 | Graetzel et al. |
| 5,856,844 A | 1/1999 | Batterman et al. |
| 6,266,142 B1 | 7/2001 | Junkins et al. |
| 6,359,211 B1 | 3/2002 | Spitler et al. |
| 6,512,233 B1 | 1/2003 | Sato et al. |
| 6,930,297 B1 | 8/2005 | Nakamura |
| 6,995,445 B2 | 2/2006 | Forrest et al. |
| 7,022,966 B2 | 4/2006 | Gonzo et al. |
| 7,049,601 B2 | 5/2006 | Agano |
| 7,196,317 B1 | 3/2007 | Meissner et al. |
| 7,247,851 B2 | 7/2007 | Okada et al. |
| 7,301,608 B1 | 11/2007 | Mendenhall et al. |
| 7,417,716 B2 | 8/2008 | Nagasaka et al. |
| 7,626,569 B2 | 12/2009 | Lanier |
| 7,677,742 B2 | 3/2010 | Hillmer et al. |
| 7,768,498 B2 | 8/2010 | Wey |
| 7,773,070 B2 | 8/2010 | Trisnadi et al. |
| 8,144,173 B2 | 3/2012 | Baba |
| 8,228,299 B1 | 7/2012 | Maloney et al. |
| 8,231,809 B2 | 7/2012 | Pschirer et al. |
| 8,345,003 B1 | 1/2013 | Trisnadi et al. |
| 8,363,526 B2 | 1/2013 | Hotta et al. |
| 8,390,793 B2 | 3/2013 | Yamaguchi et al. |
| 8,411,289 B2 | 4/2013 | Takahashi |
| 8,477,580 B2 | 7/2013 | Yamamoto et al. |
| 8,563,855 B2 | 10/2013 | Pschirer et al. |
| 8,593,565 B2 | 11/2013 | Shuster |
| 8,902,354 B2 | 12/2014 | Shuster |
| 8,908,157 B2 | 12/2014 | Eisele et al. |
| 9,104,910 B2 | 8/2015 | Huang |
| 9,385,326 B2 | 7/2016 | Wonneberger et al. |
| 9,389,315 B2 | 7/2016 | Bruder et al. |
| 9,428,518 B2 | 8/2016 | Wonneberger et al. |
| 9,557,856 B2 | 1/2017 | Send et al. |
| 9,665,182 B2 | 5/2017 | Send et al. |
| 9,741,954 B2 | 8/2017 | Bruder et al. |
| 9,829,564 B2 | 11/2017 | Bruder et al. |
| 2001/0025938 A1 | 10/2001 | Imai |
| 2002/0011576 A1 | 1/2002 | Cho et al. |
| 2003/0017360 A1 | 1/2003 | Tai et al. |
| 2003/0094607 A1 | 5/2003 | Guenther et al. |
| 2003/0128351 A1 | 7/2003 | Schmidt |
| 2003/0132391 A1 | 7/2003 | Agano |
| 2003/0227635 A1 | 12/2003 | Muller |
| 2004/0178325 A1 | 9/2004 | Forrest et al. |
| 2004/0216625 A1 | 11/2004 | Birnstock et al. |
| 2005/0052120 A1 | 3/2005 | Gupta et al. |
| 2005/0061957 A1 | 3/2005 | Kase |
| 2005/0184301 A1 | 8/2005 | Nagasaka et al. |
| 2005/0217720 A1 | 10/2005 | Rey-Mermet et al. |
| 2005/0268957 A1 | 12/2005 | Enomoto et al. |
| 2005/0269616 A1 | 12/2005 | Andriessen |
| 2006/0049397 A1 | 3/2006 | Pfeiffer et al. |
| 2006/0082546 A1 | 4/2006 | Wey |
| 2007/0008515 A1 | 1/2007 | Otani et al. |
| 2007/0010924 A1 | 1/2007 | Otani et al. |
| 2007/0080925 A1 | 4/2007 | Radivojevic et al. |
| 2007/0109558 A1 | 5/2007 | Harding |
| 2007/0122927 A1 | 5/2007 | Li et al. |
| 2007/0176165 A1 | 8/2007 | Forrest et al. |
| 2008/0080789 A1 | 4/2008 | Marks |
| 2008/0157965 A1 | 7/2008 | Shahar |
| 2008/0259310 A1 | 10/2008 | Wada |
| 2008/0269482 A1 | 10/2008 | Pschirer et al. |
| 2008/0297487 A1 | 12/2008 | Hotelling et al. |
| 2009/0009747 A1 | 1/2009 | Wolf |
| 2009/0046543 A1 | 2/2009 | De Hoog et al. |
| 2009/0097010 A1 | 4/2009 | Yamaguchi |
| 2009/0153841 A1 | 6/2009 | Ophey et al. |
| 2009/0185158 A1 | 7/2009 | Wolf |
| 2009/0188547 A1 | 7/2009 | Hayashi et al. |
| 2009/0225319 A1 | 9/2009 | Lee |
| 2009/0231582 A1 | 9/2009 | Aebischer |
| 2010/0073462 A1 | 3/2010 | Lee et al. |
| 2010/0091263 A1 | 4/2010 | Kumagai et al. |
| 2010/0141964 A1 | 6/2010 | Horsch |
| 2010/0194942 A1 | 8/2010 | Wada |
| 2010/0231513 A1 | 9/2010 | Deliwala |
| 2010/0258179 A1 | 10/2010 | Wieting |
| 2010/0279458 A1 | 11/2010 | Yeh |
| 2010/0282309 A1 | 11/2010 | Pschirer et al. |
| 2010/0283868 A1 | 11/2010 | Clark et al. |
| 2010/0297405 A1 | 11/2010 | Flores et al. |
| 2011/0055846 A1 | 3/2011 | Perez et al. |
| 2011/0096319 A1 | 4/2011 | Otani et al. |
| 2011/0099105 A1 | 4/2011 | Mennie et al. |
| 2011/0103215 A1 | 5/2011 | Hotta et al. |
| 2011/0123188 A1 | 5/2011 | Cardwell et al. |
| 2011/0194097 A1 | 8/2011 | Yamaguchi et al. |
| 2011/0284756 A1 | 11/2011 | Miko et al. |
| 2011/0297235 A1 | 12/2011 | Bergmann |
| 2011/0306413 A1 | 12/2011 | Bickerstaff et al. |
| 2012/0061587 A1 | 3/2012 | Wu |
| 2012/0063287 A1 | 3/2012 | Yamamoto et al. |
| 2012/0206336 A1 | 8/2012 | Bruder |
| 2012/0242867 A1 | 9/2012 | Shuster |
| 2012/0249998 A1 | 10/2012 | Eisele et al. |
| 2012/0250137 A1 | 10/2012 | Maxik et al. |
| 2012/0262365 A1 | 10/2012 | Mallinson |
| 2012/0262696 A1 | 10/2012 | Eisele et al. |
| 2012/0289672 A1 | 11/2012 | Kastler et al. |
| 2013/0076695 A1 | 3/2013 | Gomez et al. |
| 2013/0135604 A1 | 5/2013 | Gogolla et al. |
| 2013/0201492 A1 | 8/2013 | Takahashi |
| 2013/0222551 A1 | 8/2013 | Shamir et al. |
| 2013/0235390 A1 | 9/2013 | Holzapfel et al. |
| 2013/0271818 A1 | 10/2013 | Maxik et al. |

(56) References Cited

U.S. PATENT DOCUMENTS

| | | |
|---|---|---|
| 2014/0015242 A1 | 1/2014 | Forrest |
| 2014/0066656 A1 | 3/2014 | Bruder et al. |
| 2014/0078376 A1 | 3/2014 | Shuster |
| 2014/0132724 A1 | 5/2014 | Choi et al. |
| 2014/0209789 A1 | 7/2014 | Hu |
| 2014/0211295 A1 | 7/2014 | Maxik et al. |
| 2014/0217329 A1 | 8/2014 | Hayoz et al. |
| 2014/0291480 A1 | 10/2014 | Bruder et al. |
| 2014/0347442 A1 | 11/2014 | Wang et al. |
| 2015/0085166 A1 | 3/2015 | Shuster |
| 2015/0111337 A1 | 4/2015 | Welker et al. |
| 2015/0124241 A1 | 5/2015 | Eisele et al. |
| 2015/0124268 A1 | 5/2015 | Bruder et al. |
| 2015/0132887 A1 | 5/2015 | Welker et al. |
| 2015/0286340 A1 | 10/2015 | Send et al. |
| 2015/0372046 A1 | 12/2015 | Kim et al. |
| 2016/0099429 A1 | 4/2016 | Bruder et al. |
| 2016/0124074 A1 | 5/2016 | Wonneberger et al. |
| 2016/0127664 A1 | 5/2016 | Bruder et al. |
| 2016/0139243 A1 | 5/2016 | Send et al. |
| 2016/0140786 A1 | 5/2016 | Wang |
| 2016/0155575 A1 | 6/2016 | Yamato et al. |
| 2016/0177177 A1 | 6/2016 | Koenemann et al. |
| 2016/0211464 A1 | 7/2016 | Tanabe et al. |
| 2016/0218302 A1 | 7/2016 | Hermes et al. |
| 2016/0248021 A1 | 8/2016 | Sundarraj et al. |
| 2016/0266257 A1 | 9/2016 | Bruder et al. |
| 2016/0320489 A1 | 11/2016 | Send et al. |
| 2016/0364015 A1 | 12/2016 | Send et al. |
| 2017/0082426 A1 | 3/2017 | Bruder et al. |
| 2017/0183295 A1 | 6/2017 | Koenemann et al. |
| 2017/0205230 A1 | 7/2017 | Send et al. |
| 2017/0219694 A1 | 8/2017 | Send et al. |
| 2017/0219709 A1 | 8/2017 | Send et al. |
| 2017/0237926 A1 | 8/2017 | Bruder et al. |
| 2017/0363465 A1 | 12/2017 | Send et al. |
| 2017/0363741 A1 | 12/2017 | Send et al. |
| 2018/0003993 A1 | 1/2018 | Send et al. |
| 2018/0007343 A1 | 1/2018 | Send et al. |
| 2018/0017679 A1 | 1/2018 | Valouch et al. |
| 2018/0031672 A1 | 2/2018 | Bruder et al. |
| 2018/0067213 A1 | 3/2018 | Send et al. |

FOREIGN PATENT DOCUMENTS

| | | |
|---|---|---|
| CN | 1270706 | 10/2000 |
| CN | 1677053 A | 10/2005 |
| CN | 1723564 A | 1/2006 |
| CN | 1809801 A | 7/2006 |
| CN | 1894976 | 1/2007 |
| CN | 1896686 A | 1/2007 |
| CN | 101129074 | 2/2008 |
| CN | 101290348 A | 10/2008 |
| CN | 101449181 | 6/2009 |
| CN | 101650173 A | 2/2010 |
| CN | 101655350 | 2/2010 |
| CN | 101859439 A | 10/2010 |
| CN | 102096962 | 6/2011 |
| CN | 201897828 | 7/2011 |
| CN | 102435136 | 5/2012 |
| CN | 102506754 A | 6/2012 |
| CN | 102549380 | 7/2012 |
| CN | 102549381 A | 7/2012 |
| CN | 102737435 | 10/2012 |
| CN | 103106411 A | 5/2013 |
| CN | 103322910 A | 9/2013 |
| CN | 103492835 | 1/2014 |
| CN | 103649677 | 3/2014 |
| DE | 2 417 854 | 10/1974 |
| DE | 25 01 124 A1 | 8/1975 |
| DE | 32 25 372 A1 | 2/1983 |
| DE | 196 04 856 | 8/1997 |
| DE | 10146752 | 4/2002 |
| DE | 10 2005 043 627 A1 | 3/2007 |
| DE | 10 2005 053 995 | 5/2007 |
| DE | 10 2010 042 278 | 4/2012 |
| DE | 10 2007 037 875 A1 | 12/2012 |
| EP | 0 112 169 A2 | 6/1984 |
| EP | 0 185 450 A2 | 6/1986 |
| EP | 0 754 930 A2 | 1/1997 |
| EP | 1 176 646 A1 | 1/2002 |
| EP | 1 191 819 | 3/2002 |
| EP | 1 330 117 | 7/2003 |
| EP | 1 667 246 A1 | 6/2006 |
| EP | 1 832 910 | 9/2007 |
| EP | 2 205 657 A1 | 7/2010 |
| EP | 2 220 141 A1 | 8/2010 |
| EP | 2 507 286 A2 | 10/2012 |
| EP | 2 527 866 A1 | 11/2012 |
| EP | 2 725 617 A1 | 4/2014 |
| EP | 2 813 324 | 12/2014 |
| EP | 2 818 493 A1 | 12/2014 |
| EP | 2014/198625 A1 | 12/2014 |
| EP | 2 831 180 | 2/2015 |
| EP | 3 008 421 | 4/2016 |
| EP | 3 008 757 | 4/2016 |
| EP | 3 036 503 | 6/2016 |
| GB | 2 432 723 | 5/2007 |
| JP | S59-50579 | 3/1984 |
| JP | 61-186804 | 8/1986 |
| JP | H02-170004 | 6/1990 |
| JP | 5-48833 A | 2/1993 |
| JP | 8-159714 | 6/1996 |
| JP | 8-292586 A | 11/1996 |
| JP | 10-26513 A | 1/1998 |
| JP | 10-221064 | 8/1998 |
| JP | H11-230860 | 8/1999 |
| JP | 11-257917 | 9/1999 |
| JP | 2001-516150 | 9/2001 |
| JP | 2002-176191 | 6/2002 |
| JP | 2003-307407 | 10/2003 |
| JP | 2004-508691 | 3/2004 |
| JP | 2005-509909 | 4/2005 |
| JP | 2005-241340 A | 9/2005 |
| JP | 2007-530978 | 11/2007 |
| JP | 2008-522418 | 6/2008 |
| JP | 2010-218770 | 9/2010 |
| JP | 2010-531520 | 9/2010 |
| JP | 2011-027707 | 2/2011 |
| JP | 2012-522248 | 9/2012 |
| JP | 2012-229964 | 11/2012 |
| JP | 2012-231154 | 11/2012 |
| JP | 2013-051674 | 3/2013 |
| TW | 2011-40111 A | 11/2011 |
| WO | WO 01/29576 A1 | 4/2001 |
| WO | WO 02/101838 A1 | 12/2002 |
| WO | 03/012371 A1 | 2/2003 |
| WO | WO 2004/114112 A1 | 12/2004 |
| WO | WO 2005/106965 A1 | 11/2005 |
| WO | 99-09603 | 5/2007 |
| WO | WO 2007/054470 A1 | 5/2007 |
| WO | 2009/013282 A1 | 1/2009 |
| WO | WO 2009/013282 A1 | 1/2009 |
| WO | WO 2009/053291 A1 | 4/2009 |
| WO | WO 2009/058115 A1 | 5/2009 |
| WO | WO 2010/088032 A2 | 8/2010 |
| WO | WO 2010/094636 A1 | 8/2010 |
| WO | WO 2011/067192 A2 | 6/2011 |
| WO | WO 2011/083722 | 7/2011 |
| WO | WO 2012/001628 A1 | 1/2012 |
| WO | WO 2012/046181 A1 | 4/2012 |
| WO | WO 2012/049038 A1 | 4/2012 |
| WO | WO 2012/085803 A1 | 6/2012 |
| WO | 2012/110924 A1 | 8/2012 |
| WO | WO 2012/110924 A1 | 8/2012 |
| WO | WO 2013/144177 A1 | 8/2012 |
| WO | WO 2012/139354 | 10/2012 |
| WO | 2012/152812 A1 | 11/2012 |
| WO | 2012/168395 A1 | 12/2012 |
| WO | WO 2006/134370 | 12/2012 |
| WO | WO 2013/009676 | 1/2013 |
| WO | WO 2013/091016 A1 | 6/2013 |
| WO | 2013/118037 A1 | 8/2013 |
| WO | 2014/198626 A1 | 8/2013 |

(56) References Cited

FOREIGN PATENT DOCUMENTS

| WO | 2013/170982 A1 | 11/2013 |
|---|---|---|
| WO | 2014/086722 A1 | 6/2014 |
| WO | 2014/097181 A1 | 6/2014 |
| WO | 2014/097489 A1 | 6/2014 |
| WO | WO 2014/097181 A1 | 6/2014 |
| WO | 2014/178923 A2 | 11/2014 |
| WO | 2014/198023 A1 | 12/2014 |
| WO | 2014/198629 A1 | 12/2014 |
| WO | 2015/024871 A1 | 2/2015 |
| WO | WO 2015/091607 | 6/2015 |
| WO | WO 2015/159192 | 10/2015 |
| WO | WO 2015/161989 | 10/2015 |
| WO | 2015/193804 A2 | 12/2015 |
| WO | 2016/005893 A1 | 1/2016 |
| WO | 2016/092454 A1 | 6/2016 |
| WO | WO 2016/146725 | 9/2016 |

OTHER PUBLICATIONS

C.U. Murade et al., "High speed adaptive liquid microlens array", Optics Express, vol. 20, No. 16, Jul. 30, 2012, pp. 18180-18187.

Extended Search Report dated Aug. 23, 2011 in Europe Application No. 11154531.5 (With English Translation of Category of Cited Documents).

Erwin Bacher, et al., "Synthesis and Characterization of Photo-Cross-Linkable Hole-Conducting Polymers", Macromolecules, vol. 38, 2005, pp. 1640-1647.

H. Bruce Goodbrand, et al., "Ligand-Accelerated Catalysis of the Ullmann Condensation: Application to Hole Conducting Triarylamines", J. Org. Chem., vol. 64, 1999, pp. 670-674.

Felix E. Goodson, et al., "Palladium-Catalyzed Synthesis of Pure, Regiodefined Polymeric Triarylamines", J. Am. Chem. Soc., vol. 121, 1999, pp. 7527-7539.

John F. Hartwig, "Transition Metal Catalyzed Synthesis of Arylamines and Aryl Ethers from Aryl Halides and Triflates: Scope and Mechanism", Angew. Chem. Int. Ed., vol. 37, 1998, pp. 2046-2067.

Sheila I. Hauck, et al., "Tetraazacyclophanes by Palladium-Catalyzed Aromatic Amination. Geometrically Defined, Stable, High-Spin Diradicals", Organic Letters, vol. 1, No. 13, 1999, pp. 2057-2060.

Ping-Hsin Huang, et al., "Synthesis and Characterization of new fluorescent two-photon absorption chromophores", J. Mater. Chem., vol. 16, 2006, pp. 850-857.

Qinglan Huang, et al., "Molecularly 'Engineered' Anode Adsorbates for Probing OLED Interfacial Structure-Charge Injection/Luminance Relationships: Large, Structure-Dependent Effects", J. Am. Chem. Soc., vol. 125, 2003, pp. 14704-14705.

A. Balionyte, et al., "Carbazolyl-substituted triphenyldiamine derivatives as novel photoconductive amorphous molecular materials", Journal of Photochemistry and Photobiology A: Chemistry, vol. 162, 2004, pp. 249-252.

G. R. A. Kumara, et al., "Fabrication of Dye-Sensitized Solar Cells Using Triethylamine, Hydrothiocyanate as a CuI Crystal Growth inhibitor", Langmuir, vol. 18, 2002, pp. 10493-10495.

Lukas Schmidt-Mende, et al., "Organic Dye for Highly Efficient Solid-State Dye-Sensitized Solar Cells", Adv. Mater., vol. 17, No. 7, 2005, pp. 813-815.

James Lindley, "Copper Assisted Nucleophilic Substitution of Aryl Halogen", Tetrahedron, vol. 40, No. 9, 1984, pp. 1433-1456.

Yunqi Liu, et al., "Synthesis and characterization of a novel bipolar polymer for light-emitting diodes", Chem. Commun., vol. 24, 1998, pp. 2747-2748.

Narukuni Hirata, et al., "Interface engineering for solid-state dye-sensitised nanocrystalline solar cells: the use of an organic redox cascade", Chem. Commun., vol. 5, 2006, pp. 535-537.

Qingjiang Yu, et al., "High-Efficiency Dye-Sensitized Solar Cells: The Influence of Lithium Ions on Exciton Dissociation, Charge Recombination, and Surface States", ACS Nano, vol. 4, No. 10, 2010, pp. 6032-6038.

Bin Peng, et al., "Systematic investigation of the role of compact $TiO_2$ solar cells", Coordination Chemistry Reviews, vol. 248, 2004, pp. 1479-1489.

Jiun Yi Shen, et al., "High $T_g$ blue emitting materials for electroluminescent devices", J. Mater. Chem., vol. 15, 2005, pp. 2455-2463.

Tobat P. I. Saragi, et al., "Comparison of Charge-Carrier Transport in Thin Films of Spiro-Linked Compounds and Their Corresponding Parent Compounds", Adv. Funct. Mater., vol. 16, 2006, pp. 966-974.

V. P. S. Perera, et al., "Dye-Sensitized Solid-State Photovoltaic Cells Based on Dye Multilayer-Semiconductor Nanostructures", J. Phys. Chem. B, vol. 107, 2003, pp. 13758-13761.

U. Bach, et al., "Solid-state dye-sensitized mesoporous $TiO_2$ solar cells with high photon-to-electron conversion efficiencies", Nature, vol. 395, 1998, pp. 583-585.

John P. Wolfe, et al., "Rational Development of Practical Catalysts for Aromatic Carbon-Nitrogen Bond Formation", Acc. Chem. Res. vol. 31, 1998, pp. 805-818.

Bryant H. Yang, et al., "Palladium-Catalyzed amination of aryl halides and sulfonates", Journal of Organometallic Chemistry, vol. 576, 1999, pp. 125-146.

Zhong Hui Li, et al., "Synthesis and Functional Properties of Strongly Luminescent Diphenylamino End-Capped Oligophenylenes", J. Org. Chem., vol. 69, 2004, pp. 921-927.

Brian O'Regan, et al., "A low-cost, high-efficiency solar cell based on dye-sensitized colloidal $TiO_2$ films", Letters to Nature, vol. 353, 1991, pp. 737-740.

International Search Report dated Sep. 24, 2014 in PCT/EP2014/061682.

International Preliminary Report on Patentability and Written Opinion dated Dec. 15, 2015 in PCT/EP2014/061682.

International Preliminary Report on Patentability and Written Opinion dated Dec. 23, 2015 in PCT/EP2014/061695.

International Search Report and Written Opinion dated May 31, 2012 in PCT/IB2012/050592 filed on Feb. 9, 2012.

Supplementary European Search Report dated Nov. 19, 2014, issued in corresponding European Patent Application No. EP 12 74 6808.

Volker Viereck, et al., Large-area applications of optical MEMS: micromirror arrays guide daylight, optimize indoor illumination, Optical Components, Photonik International 2, 2009; pp. 48-49.

C.U. Murade, et al., "High speed adaptive liquid microiens array", Optics Express, vol. 20, No. 16, Jul. 2012. pp. 18180-18187.

Jason Heikenfeld, et al., "Recent Progress in Arrayed Electrowetting Optics", Optics & Photonics News, Jan. 2009, 7 pages, www.osa-opn.org.

Tao Peng, "Algorithms and models for 3-D shape measurement Using digital fringe projections", Dissertation, University of Maryland (College Park, Md.), Jan. 16, 2007, 268 pages (http://drum.lib.umd.edu//handle/1903/6654; http://en.wikipedia.org/wiki/Gray_code; http://en.wikipedia.org/wiki/Structured-light_3D_scanner).

Jie-Ci Yang et al., "An Intelligent Automated Door Control System Based on a Smart", Sensors, 2013, 13(5), pp. 5923-5936: doi: 10.3390/s130505923 www.mdpi.com/journal/sensors.

Tomas Leijtens, et al., "Hole Transport Materials with Low Glass Transition Temperatures and High Solubility for Application in Solid-State Dye-Sensitized Solar Cells", ACS Nano, vol. 6, No. 2, 2012, pp. 1455-1462 www.acsnano.org.

International Search Report and Written Opinion dated Oct. 31, 2014 in PCT/EP2014/067466 filed Aug. 15, 2014.

Paul Pargas, "Phenomena of Image Sharpness Recognition of CdS and CdSe Photoconductors" Journal of the Optical Society of America, vol. 54, No. 4, Apr. 1964, pp. 516-519.

Paul Pargas, "A Lens Measuring Method Using Photoconductive Cells" Journal of the SMPTE, vol. 74, Jun. 1965, pp. 501-504.

Jack T. Billings, "An Improved Method for Critical Focus of Motion-Picture Optical Printers" Journal of the SMPTE, vol. 80, Aug. 1971, pp. 624-628.

International Search Report dated Sep. 9, 2014 in PCT/EP2014/061688 filed Jun. 5, 2014.

Written Opinion of the International Searching Authority dated Sep. 9, 2014 in PCT/EP2014/061688 filed Jun. 5, 2014.

(56) References Cited

OTHER PUBLICATIONS

International Search Report and Written Opinion of the International Searching Authority dated Mar. 12, 2015 in PCT/EP2014/078155 Filed Dec. 17, 2014.
International Search Report and Written Opinion of the International Searching Authority dated May 16, 2014 in PCT/IB2013/061095.
Atte Haapalinna, et al., "Measurement of the Absolute Linearity of Photodetectors with a Diode Laser," Meas. Sci. Technol., 10, (1999) 1075-1078.
M. R. Andersen, et al., "Kinect Depth Sensor Evaluation for Computer Vision Applications",Electrical and Computer Engineering, Technical Report ECE-TR-6, Aarhus University, 2012, 39 pages.
Takumi Kinoshita, et al., "Wideband dye-sensitized solar cells employing a phosphine-coordinated ruthenium sensitizer", Nature Photonics, vol. 7, 2013, pp. 535-239.
Seigo Ito, et al., "High-Efficiency Organic-Dye-Sensitized Solar Cells Controlled by Nanocrystalline-$TiO_2$ Electrode Thickness", Adv. Mater., vol. 18, 2006, pp. 1202-1205.
Office Action dated Apr. 22, 2015 in Chinese Patent Application No. 201280018328.5 (submitting English translation only).
International Search Report and Written Opinion dated Sep. 3, 2014 in PCT/EP2014/061691.
International Preliminary Report on Patentability dated Sep. 25, 2015 in PCT/EP2014/061691.
Kuthirumal, S., et al., "Flexible Depth of Field Photography," IEEE Transactions on Pattern Analysis and Machine Intelligence, vol. 33, No. 1 (2011), pp. 58-71.
Hiura Shinsaku et al., "Depth Measurement by the Mufti-Focus Camera," Computer Vision and Pattern Recognition, 1998. Proceedings. 1998 IEEE Computer Society Conference on Santa Barbara, CA, USA, Jun. 23-25, 1998, pp. 953-959.
International Preliminary Report on Patentability and Written Opinion dated Dec. 23, 2015 in PCT/EP2014/061688.
Denis Klimentjew et al., "Multi Sensor Fusion of Camera and 3D Laser Range Finder for Object Recognition" 2010 IEEE International Conference on Multisensor Fusion and integration for Intelligent Systems, 2010, pp. 236-241.
International Search Report and Written Opinion dated Nov. 21, 2014 in PCT/EP2014/067465.
"So funktioniert die DLP-Technologie" DLP-Technologie-www.dlp.com/de/technology/how-dip-works, 2014, 2 Pages.
"NEW—Ultra-Compact Pockels Cells with Brewster Polarizer and Waveplate for Laser Q-Switching" Leysop Ltd, Manfacturers and Suppliers of Electro-Optic Components—http//www.leysop.com/integrated_pockels_cell.htm, Aug. 4, 2013, 2 Pages.
D. Scaramuzza, et al., "Extrinsic Self Calibration of a Camera and a 3D Laser Range Finder from Natural Scenes" 2007 IEEE/RSJ International Conference on Intelligent Robots and Systems, 2007, 8 pages.
International Search Report dated Aug. 28, 2015, in PCT/IB2015/052769, filed Apr. 16, 2015.
International Search Report and Written Opinion dated Jun. 30, 2015 in PCT/IB15/052233 Filed Mar. 26, 2015.
International Search Report dated Sep. 22, 2015, in Application No. PCT/IB2015/052785, filed on Apr. 16, 2015.
International Search Report dated Nov. 27, 2015, in PCT/IB2015/055121, filed Jul. 7, 2015.
International Search Report and Written Opinion dated Mar. 29, 2016, in PCT/IB2015/054536, filed Jun. 16, 2015.
Wang, Feng-Peng et al., "Distance Measurement using Digital Cameras Based on Laser Spot Detection", published on Jun. 30, 2011, School of Physics and Electronic Information, Garman Normal University, Ganzhou 341000, China (with Engish Abstract).
U.S. Appl. No. 15/534,335, filed Jun. 8, 2017, Send, et al.
U.S. Appl. No. 15/534,294, filed Jun. 8, 2017, Send, et al.
U.S. Appl. No. 15/533,572, filed Jun. 6, 2017, Send, et al.
U.S. Appl. No. 15/534,343, filed Jun. 8, 2017, Send, et al.
U.S. Appl. No. 15/534,041, filed Jun. 8, 2017, Send, et al.
U.S. Appl. No. 15/309,631, filed Nov. 8, 2016, US 2017-0183295, Koenemann, et al.
U.S. Appl. No. 14/907,100, filed Jan. 22, 2016, US 2016-0155575, Yamato et al.
U.S. Appl. No. 14/913,817, filed Feb. 23, 2016, US 2016-0248021, Sundarraj, et al.
U.S. Appl. No. 14/916,523, filed Mar. 3, 2016, US 2016-0218302, Hermes, et al.
U.S. Appl. No. 14/913,860, filed Feb. 23, 2016, US 2016-0211464, Tanabe, et al.
U.S. Appl. No. 14/910,078, filed Feb. 24, 2016, US 2016-0177177, Koenemann, et al.
U.S. Appl. No. 15/587,420, filed May 5, 2017, Bruder, et al.
U.S. Appl. No. 15/547,664, filed Jul. 31, 2017, Valouch, et al.
U.S. Appl. No. 15/554,496, filed Aug. 30, 2017, Send, et al.
U.S. Appl. No. 15/727,733, filed Oct. 9, 2017, Bruder, et al.
http://www.plenoptic.info/pages/refocusing.html.
C. Hahne, A. Aggoun, S. Haxha, V. Velisavljevic, and J. Fernández, "Light field geometry of a standard plenoptic camera," Opt. Express 22, 26659-26673 (2014).
C. Hahne, A. Aggoun, S. Haxha, V. Velisavljevic, and J. Fernández, "Baseline of virtual cameras acquired by a standard plenoptic camera setup," in 3D-TV-Conference: The True Vision—Capture, Transmission and Display of 3D Video (3DTV-CON), Jul. 2-4, 2014.
C. Hahne, A. Aggoun, and V. Velisavljevic, "The refocusing distance of a standard plenoptic photograph," in 3D-TV-Conference: The True Vision—Capture, Transmission and Display of 3D Video (3DTV-CON), Jul. 8-10, 2015.
C. Hahne and A. Aggoun, "Embedded FIR filter design for real-time refocusing using a standard plenoptic video camera," Proc. SPIE 9023, in Digital Photography X, 902305 (Mar. 7, 2014).
U.S. Appl. No. 15/751,283, filed Feb. 8, 2018, Send, et al.
Bahaa E. A. Saleh, et al., "Fundamentals of Photonics" John Wiley & Sons, Inc., Chapter 3, 1991, pp. 80-107 (with Cover Page).
International Search Report dated Mar. 21, 2016, in PCT/IB2015/059406.
International Search Report and Written Opinion in PCT/IB2015/059411 dated Mar. 16, 2016 filed Dec. 7, 2015.
Nam-Trung Nguyen, "Micro-optofluidic Lenses: A review", Biomicrofluidics, 2010, vol. 4, 031501-15.
Uriel Levy et al., "Tunable optofluidic devices", Microfluid Nanofluid, 2008, vol. 4, pp. 97-105.
International Search Report and Written Opinion dated Mar. 15, 2016 in PCT/IB2015/059404 filed Dec. 7, 2014.
International Search Report and Written Opinion dated Mar. 21, 2016, in PCT/IB2015/059403, filed Dec. 7, 2015.
International Search Report dated Mar. 22, 2016 in PCT/IB2015/059408 filed Dec. 7, 2015.
International Search Report and Written Opinion dated May 27, 2016, in PCT/EP2016/051817, filed Jan. 28, 2016.
International Search Report dated May 20, 2016, in PCT/EP2016/054532.
International Preliminary Report on Patentability dated Aug. 1, 2017, in PCT/EP2016/051817.
Linyi Bian, et al., "Recent Progress in the Design of Narrow Bandgap Conjugated Polymers for High-Efficiency Organic Solar Cells", Progress in Polymer Science. vol. 37, 2012, pp. 1292-1331.
Antonio Facchetti, "Polymer donor-polymer acceptor (all-polymer) solar Cells", Materials Today, vol. 16 No. 4, Apr. 2013, pp. 123-132.
Graham H. Carey, et al., "Colloidal Quantum Dot Solar Cells", Chemical Reviews. vol. 115 No. 23, 2015. pp. 12732-12763.
Jason P. Clifford, et al., "Fast, Sensitive and Spectrally Tunable Colloidal Quantum-Dot Photodetectors", Nature Nanotechnology, Jan. 2009, pp. 1-5.
Kotaro Fukushima, et al., "Crystal Structures and Photocarrier Generation of Thioindigo Derivatives", Journal of Physical Chemistry B, vol. 102 No. 31, 1998, pp. 5985-5990.
Serap Günes, et al., "Hybrid Solar Cells", Inorganica Chimica Acta, vol. 361, 2008, pp. 581-588.
R. S. Mane, et al., "Chemical Deposition Method for Metal Chalcogenide Thin Films", Materials Chemistry arid Physics, vol. 65, 2000, pp. 1-31.

(56) References Cited

OTHER PUBLICATIONS

Wilfried Hermes, "Emerging Thin-Film Photovoltaic Technologies". Chemie Ingenieur Technik, 2015, vol. 87 No. 4, pp. 376-389.
Paul H. Keck, "Photoconductivity in Vacuum Coated Selenium Films", Journal Optical Society of America, vol. 42 No. 4, Apr. 1952, pp. 221-225, with cover page.
Frank H. Moser, et al.. "Phthalocyanine Compounds", Reinhold Publishing Corporation, 1963, p. 69-76 with cover pages.
M. Popescu, "Disordered Chalcogenide Optoelectronic Materials: Phenomena and Applications", Journal of Optoelectronics and Advanced Materials, vol. 7 No. 4, Aug. 2005, pp. 2189-2210.
Friedrich Andreas Sperlich, "Electron Paramagnetic Resonance Spectroscopy of Conjugated Polymers and Fullerenes for Organic Photovoltaics", Julius-Maximilians-Universität Würzburg, 2013, pp. 1-127.
F. Stöckmann, "Superlinear Photoconductivity", Physica Status Solidi, vol. 34, 1969, pp. 751-757.
Evangelos Theocharous, "Absolute Linearity Measurements on a PbS Detector in the Infrared", Applied Optics, vol. 45 No. 11, Apr. 10, 2006, pp. 2381-2386.
Evangelos Theocharous, et al., "Absolute Linearity Measurements on HgCdTe Detectors in the Infrared Region", Applied Optics, vol. 43 No. 21, Jul. 20, 2004, pp. 4182-4188.
Arthur L. Thomas, "Phthalocyanine Research and Applications", CRC Press, 1990, pp. 253-271 with cover pages.
Baeg et al., "Organic Light Detectors: Photodiodes and Phototransistors", *Advanced Materials*, vol. 25, No. 31, Mar. 11, 2013, pp. 4267-4295.
Office Action dated Jan. 3. 2018, in Chinese Patent Application No. 201610552144.7 parallel to U.S. Appl. No. 15/364,680.
Office Action dated Mar. 5, 2018, in corresponding Chinese Patent Application No. 201480056299.0.
International Preliminary Report on Patentability and Written Opinion dated Feb. 22, 2018 in PCT/EP2016/069049).

DETECTOR FOR OPTICALLY DETERMINING A POSITION OF AT LEAST ONE OBJECT

DESCRIPTION

Field of the Invention

The invention relates to a detector for optically determining a position of at least one object. Further, the invention relates to a detector being adapted for providing stereoscopic vision. Furthermore, the invention relates to a human-machine interface, an entertainment device, a tracking system, a scanning device, and a camera. Furthermore, the invention relates to a method for optically detecting a position of at least one object and to various uses of the detector. Such devices, methods and uses can be employed for example in various areas of daily life, gaming, traffic technology, production technology, security technology, medical technology or in the sciences. However, other applications are also possible in principle.

Prior Art

Various optical sensors and photovoltaic devices are known from prior art. While photovoltaic devices are generally used to convert electromagnetic radiation, in particular, ultraviolet, visible or infrared light, into electrical signals or electrical energy, optical detectors are generally used for picking up image information and/or for detecting at least one optical parameter, for example, a brightness.

Various optical sensors which can be based generally on the use of inorganic and/or organic sensor materials are known from prior art. To an increasing extent, in particular for improving large-area processing, sensors comprising at least one organic sensor material are being used, as described for example in US 2007/0176165 A1. In particular, so-called dye solar cells are increasingly of importance, which are described generally, for example in WO 2009/013282 A1.

Various detectors for optically detecting at least one object are known on the basis of such optical sensors. WO 2012/110924 A1 discloses a detector comprising at least one optical sensor, wherein the optical sensor has at least one sensor region. Herein, the optical sensor is designed to generate at least one sensor signal in a manner dependent on an illumination of the sensor region. The sensor signal, given the same total power of the illumination, is hereby dependent on a geometry of the illumination, in particular on a beam cross-section of the illumination on the sensor area, which may be denominated as "FiP effect". Consequently, this kind of optical sensor which employs the FiP effect may also be referred to as a "FiP sensor". The detector furthermore has at least one evaluation device designated to generate at least one item of geometrical information from the sensor signal, in particular at least one item of geometrical information about the illumination and/or the object.

WO 2014/097181 A1 discloses a method and a detector for determining a position of at least one object, by using at least one transversal optical sensor and at least one longitudinal optical sensor. Preferably, a stack of longitudinal optical sensors is employed, in particular to determine a longitudinal position of the object with a high degree of accuracy and without ambiguity. Herein, the stack may further comprise at least one transversal optical sensor and, optionally, at least one imaging device which may be arranged, particularly together with the longitudinal optical sensors, along a common optical axis of the detector along which the light beam may travel. For this purpose, all but the last optical sensor within a particular beam path may, preferably, be transparent. Further, the at least one transversal optical sensor and the at least one longitudinal optical sensor may also at least partially be integrated into a combined optical sensor. For this purpose, the second electrode of the at least one longitudinal optical sensor may optionally be subdivided into partial electrodes which may be contacted individually, wherein the second electrode may be designed to provide a single sensor signal and, thus, may provide a single electrode contact only. Thus, in addition to a longitudinal signal, transversal sensor signals may be generated with the longitudinal optical sensor. Furthermore, WO 2014/097181 A1 discloses a human-machine interface, an entertainment device, a tracking system, and a camera, each comprising at least one detector for determining a position of at least one object.

European patent application number 14 196 942.8, filed Dec. 9, 2014, the full content of which is herewith included by reference, discloses that two or more optical sensors and, optionally, at least one imaging device which may be placed in different branches of the setup, in particular, in separate partial beam paths, wherein one or more beam-splitting elements may be used for partitioning an incident light beam. As an example, a FiP sensor being adapted for determining depth information and an imaging device adapted for capturing a two-dimensional image may be arranged in separate partial beam paths of the detector. This arrangement may, particularly, allow using more than one intransparent optical sensor or, if applicable, imaging device in the detector. Furthermore, the optical sensor and the image sensor may constitute a "hybrid sensor", i.e. an assembly which may simultaneously comprise one or more organic and/or inorganic materials, in particular in a combination of at least one FiP sensor and of at least one pixelated optical detector, in particular an inorganic image sensor, such as a CCD device or a CMOS device.

International patent application number PCT/IB2015/054536, filed Jun. 16, 2015, the full content of which is herewith included by reference, discloses a detector which comprises at least one illumination source emitting at least one light beam which comprises a component parallel to an image plane of at least one optical sensor, wherein the optical sensor is adapted to determine a transversal component of the position of the object approaching the optical sensor in a manner that light is scattered from the component of the light beam, wherein the optical sensor is further designed to generate at least one longitudinal sensor signal dependent on an illumination of the sensor by light scattered from the component of the light beam, and an evaluation device for generating at least one item of information on a transversal component of a position of the object by evaluating the transversal sensor signal and at least one item of information on a longitudinal component of a position of the object by evaluating the longitudinal sensor signal. This detector may particularly be used as a proximity sensor for detecting a position of at least one object, such as a finger, a hand, or another object related thereto, which passes the detector particularly at a close distance, thus enabling a person to interact with a display or a human-machine interface without being compelled to actually touch it.

PROBLEM ADDRESSED BY THE INVENTION

Despite the advantages as implied by the above-mentioned devices and detectors, specifically by the detectors as disclosed as in WO 2012/110924 A1, WO 2014/097181 A1, or international patent application number PCT/IB2015/054536, there is still a need for a simple, cost-efficient, and reliable spatial detector. Therefore, a problem addressed by the present invention is that of specifying devices and methods for optically detecting at least one object which at least substantially avoid the disadvantages of known devices and methods of this type.

In particular, is would be desirable to provide an improved optical sensor and a related method for fast and concurrently sensing transversal and longitudinal components of a position of an object at a high resolution which, however, does neither require a sophisticated manufacturing of the corresponding device nor complicated evaluation processes in performing the respective method.

Further, it would be desirable to provide a detector and a stereoscopic system comprising at least one detector which may especially be adapted for providing stereoscopic vision, wherein, preferably, the at least one item of information on the position of the object may be generated with reduced effort as compared to comparable kind of systems which are known from prior art.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used herein, the expressions "have", "comprise" and "contain" as well as grammatical variations thereof are used in a non-exclusive way. Thus, the expression "A has B" as well as the expression "A comprises B" or "A contains B" may both refer to the fact that, besides B, A contains one or more further components and/or constituents, and to the case in which, besides B, no other components, constituents or elements are present in A.

In a first aspect of the present invention, a detector for determining a position of at least one object is disclosed.

As used herein, the "object" may generally be an arbitrary object, chosen from a living object and a non-living object. Thus, as an example, the at least one object may comprise one or more articles and/or one or more parts of an article. Additionally or alternatively, the object may be or may comprise one or more living beings and/or one or more parts thereof, such as one or more body parts of a human being, e.g. a user and/or an animal.

As used herein, a "position" generally refers to an arbitrary item of information on a location and/or orientation of the object in space. For this purpose, as an example, one or more coordinate systems may be used, and the position of the object may be determined by using one, two, three or more coordinates. As an example, one or more Cartesian coordinate systems and/or other types of coordinate systems may be used. In one example, the coordinate system may be a coordinate system of the detector in which the detector has a predetermined position and/or orientation. As will be outlined in further detail below, the detector may have an optical axis, which may constitute a main direction of view of the detector. The optical axis may form an axis of the coordinate system, such as a z-axis. Further, one or more additional axes may be provided, preferably perpendicular to the z-axis.

Thus, as an example, the detector may constitute a coordinate system in which the optical axis forms the z-axis and in which, additionally, an x-axis and a y-axis may be provided which are perpendicular to the z-axis and which are perpendicular to each other. As an example, the detector and/or a part of the detector may rest at a specific point in this coordinate system, such as at the origin of this coordinate system. In this coordinate system, a direction parallel or antiparallel to the z-axis may be regarded as a longitudinal direction, and a coordinate along the z-axis may be considered a longitudinal coordinate. An arbitrary direction perpendicular to the longitudinal direction may be considered a transversal direction, and an x- and/or y-coordinate may be considered a transversal coordinate.

Alternatively, other types of coordinate systems may be used. Thus, as an example, a polar coordinate system may be used in which the optical axis forms a z-axis and in which a distance from the z-axis and a polar angle may be used as additional coordinates. Again, a direction parallel or anti-parallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

As used herein, a "detector" for determining a position of at least one object generally is a device being adapted for providing at least one item of information on the position of the at least one object. The detector may be a stationary device or a mobile device. Further, the detector may be a stand-alone device or may form part of another device, such as a computer, a vehicle or any other device. Further, the detector may be a hand-held device. Other embodiments of the detector are feasible.

The detector may be adapted to provide the at least one item of information on the position of the at least one object in any feasible way. Thus, the information may e.g. be provided electronically, visually, acoustically or in any arbitrary combination thereof. The information may further be stored in a data storage of the detector or a separate device and/or may be provided via at least one interface, such as a wireless interface and/or a wire-bound interface.

According to the present invention, the detector comprises:
 at least one optical sensor for determining a position of at least one light beam traveling from the object to the detector, wherein the optical sensor has at least a first electrode and a second electrode, wherein at least one photovoltaic material is embedded in between the first electrode and the second electrode, wherein the photovoltaic material is adapted to generate electric charges in response to an illumination of the photovoltaic material with light, wherein the first electrode or the second electrode is a split electrode having at least three partial electrodes, wherein each partial electrode is adapted to generate at least one sensor signal, wherein the sensor signal is dependent on a beam cross-section of the light beam in a sensor region of the optical sensor; and
 at least one evaluation device, wherein the evaluation device is designed to generate at least one item of information on a transversal position of the object, the transversal position being a position in at least one plane perpendicular an optical axis of the detector, by evaluating the sensor signal of pairs of the partial electrodes, and wherein the evaluation device is designed to generate at least one item of information on a longitudinal position of the object by evaluating a sum of the sensor signals of all partial electrodes.

As will be outlined in further detail below, the components listed above may be separate components. Alternatively, two or more of the components listed above may be integrated into one component. Thus, the at least one evaluation device may be formed as a separate evaluation device independent from the at least one optical sensor, but may preferably be connected to the at least one optical sensor in order to receive the sensor signal. Alternatively, the at least one evaluation device may fully or partially be integrated into the at least one optical sensor.

With regard to the term "transversal position", reference may be made to the definition given above. Thus, preferably, the transversal position may be or may comprise at least one coordinate in at least one dimension perpendicular to an optical axis of the detector. As an example, the transversal position may be a position of a light spot generated by the light beam in a plane perpendicular to the optical axis, such as on a light-sensitive sensor surface of the optical sensor. As an example, the position in the plane may be given in Cartesian coordinates and/or polar coordinates. Other embodiments are feasible.

The at least one sensor signal generally may be an arbitrary signal indicative of the transversal position. As an example, the sensor signal may be or may comprise a digital and/or an analog signal. As an example, the sensor signal may be or may comprise a voltage signal and/or a current signal. Additionally or alternatively, the sensor signal may be or may comprise digital data. The sensor signal may comprise a single signal value and/or a series of signal values. The sensor signal may further comprise an arbitrary signal which is derived by combining two or more individual signals, such as by averaging two or more signals and/or by forming a quotient of two or more signals, as will be outlined in further detail below.

As will further be outlined below, preferably, the at least one "optical sensor" may comprise one or more photo detectors, preferably one or more organic photodetectors and, most preferably, one or more dye-sensitized organic solar cells (DSCs, also referred to as dye solar cells), such as one or more solid dye-sensitized organic solar cells (s-DSCs). Thus, the optical sensor is a photo detector having at least one first electrode, at least one second electrode and at least one photovoltaic material, wherein the photovoltaic material is embedded in between the first electrode and the second electrode. As used herein, a "photovoltaic material" generally is a material or combination of materials adapted to generate electric charges in response to an illumination of the photovoltaic material with light.

As used herein, the term "evaluation device" generally refers to an arbitrary device designed to generate the at least one item of information on the position of the object. As an example, the evaluation device may be or may comprise one or more integrated circuits, such as one or more application-specific integrated circuits (ASICs), and/or one or more data processing devices, such as one or more computers, preferably one or more microcomputers and/or microcontrollers. Additional components may be comprised, such as one or more preprocessing devices and/or data acquisition devices, such as one or more devices for receiving and/or preprocessing of the sensor signal, such as one or more AD-converters and/or one or more filters. Further, the evaluation device may comprise one or more data storage devices. Further, as outlined above, the evaluation device may comprise one or more interfaces, such as one or more wireless interfaces and/or one or more wire-bound interfaces.

The at least one evaluation device may be adapted to perform at least one computer program, such as at least one computer program performing or supporting the step of generating the at least one item of information on the transversal position and/or the step of generating the at least one item of information on the longitudinal position. As an example, one or more algorithms may be implemented which, by using the sensor signal as input variable, may perform a predetermined transformation into the transversal position and/or the longitudinal position of the object.

According to the present invention, the first electrode or the second electrode of the optical sensor is a split electrode having at least three partial electrodes, wherein the optical sensor has a sensor area, wherein the at least one sensor signal indicates a position of the light beam in the sensor area. Thus, as outlined above, the optical sensor may be or may comprise one or more photo detectors, preferably one or more organic photo detectors, more preferably one or more DSCs or sDSCs. The sensor area may be a surface of the photo detector facing towards the object. The sensor area preferably may be oriented perpendicular to the optical axis. Thus, the sensor signal may indicate a position of a light spot generated by the light beam in a plane of the sensor area of the optical sensor.

In a specific embodiment of the present invention, the detector may be designed to detect at least two sensor signals, in particular, in the case wherein the detector may be impinged by at least two different wavelengths, preferably by employing at least two separate photo detectors. Herein, as an example, a first phot detector may be transparent for a first part of the optical spectrum and absorbing for the other parts of the optical spectrum, whereas at least one second photo detector which may be placed behind the photo detector with respect to the direction of the impinging light beam may be transparent for a second part of the optical spectrum and, particularly, absorbing for the first part of the spectrum for which the first photo detector may be transparent.

Generally, as used herein, the term "split electrode" refers to an electrode out of a plurality of electrodes, adapted for measuring at least one current and/or voltage signal, preferably independent from other partial electrodes. Thus, in case a plurality of partial electrodes is provided, the first electrode or the second electrode is adapted to provide a plurality of electric potentials and/or electric currents and/or voltages via the at least three partial electrodes, which may be measured and/or used independently.

By using at least one optical sensor, wherein the first electrode or the second electrode is a split electrode with three or more partial electrodes, currents through the partial electrodes may be dependent on a position of the light beam in the sensor area. This may generally be due to the fact that Ohmic losses or resistive losses may occur on the way from a location of generation of electrical charges due to the impinging light onto the partial electrodes. Thus, besides the partial electrodes, the split electrode may comprise one or more additional electrode materials connected to the partial electrodes, wherein the one or more additional electrode materials provide an electrical resistance. Thus, due to the Ohmic losses on the way from the location of generation of the electric charges to the partial electrodes through with the one or more additional electrode materials, the currents through the partial electrodes depend on the location of the generation of the electric charges and, thus, to the position of the light beam in the sensor area. For details of this principle of determining the position of the light beam in the sensor area, reference may be made to the preferred embodiments below and/or to the physical principles and device options as disclosed e.g. in U.S. Pat. No. 6,995,445 and/or US 2007/0176165 A1.

The optical sensor may further be adapted to generate the sensor signal in accordance with the electrical currents through the partial electrodes. Thus, a ratio of electric currents through two horizontally adjacent partial electrodes may be formed, thereby generating an x-coordinate, and/or a ratio of electric currents through to vertically adjacent partial electrodes may be formed, thereby generating a y-coordinate. The detector, preferably the optical sensor and/or the evaluation device, may be adapted to derive the information on the transversal position of the object from at least one ratio of the currents through the partial electrodes. However, other ways of generating position coordinates by comparing currents through the partial electrodes are feasible.

In a particularly preferred embodiment, the split electrode may comprise two pairs of two partial electrodes, wherein two sides of each partial electrode may adjoin one side of a further partial electrode in a manner that the surface of the four partial electrodes may altogether occupy a rectangular area, such as a square area, on the optical sensor. However, other arrangements are possible, such as an arrangement with three pairs of two or three partial electrodes still occupying a rectangular area, such as a square area, on the optical sensor or not, or an hexagonal arrangement with six partial electrodes each partial electrode having the form of a triangle in a manner that the surface of the six partial electrodes may altogether occupy a hexagonal area on the optical sensor.

Within this regard it may be particularly advantageous to arrange the partial electrodes in a manner that the surface created by the specific arrangement may cover a specific area with as least as possible dead space between adjoining partial electrodes, in particular, in order to achieve a current from the respective partial electrodes as large as possible. In particular, two adjacent partial electrodes may be arranged in the optical sensor in a manner that no or only a small gap may remain between them. Alternatively, the two adjacent partial electrodes may even partially overlap each other in a manner that an overlap area may be created, wherein the overlap area might occupy 1% or less of an area of each of the overlapping partial electrodes.

As outlined above, preferably, the at least one optical sensor may be a transparent optical sensor. Therefore, the at least one first electrode of the optical sensor preferably is transparent. As used in the present invention, the term "transparent" generally refers to the fact that the intensity of light after transmission through the transparent object equals to or exceeds 10%, preferably 40% and, more preferably, 60% of the intensity of light before transmission through the transparent object. More preferably, the at least one first electrode of the optical sensor may fully or partially be made of at least one transparent conductive oxide (TCO). As an example, indium-doped tin oxide (ITO) and/or fluorine-doped tin oxide (FTO) may be named. Further examples will be given below. Further, the at least one second electrode of the optical sensor preferably may fully or partially be transparent.

Thus, specifically, the split electrode may comprise three or more partial electrodes and at least one additional electrode material contacting the three or more partial electrodes. According to the present invention, the at least one split electrode of the optical sensor may fully be made of at least one conductive polymer, preferably a transparent conductive polymer. As an example, conductive polymers having an electrical conductivity of at least 0.01 S/cm may be used, preferably of at least 0.1 S/cm or, more preferably, of at least 1 S/cm or even at least 10 S/cm or at least 100 S/cm. As an example, the at least one conductive polymer may be selected from the group consisting of: a poly-3,4-ethylenedioxythiophene (PEDOT), preferably PEDOT being electrically doped with at least one counter ion, more preferably PEDOT doped with sodium polystyrene sulfonate (PEDOT: PSS); a polyaniline (PANI); a polythiophene.

As outlined above, the conductive polymer may provide an electrical connection between the at least three partial electrodes. The conductive polymer may provide an Ohmic resistivity, thus allowing for determining the position of charge generation. Preferably, the conductive polymer provides an electric resistivity of 0.1-20 k$\Omega$ between the partial electrodes, preferably an electric resistivity of 0.5-5.0 k$\Omega$ and, more preferably, an electric resistivity of 1.0-3.0 k$\Omega$. As used herein, a "conductive material" may generally be a material which has a specific electrical resistance of less than $10^4$, less than $10^3$, less than $10^2$, or of less than 10 $\Omega$m. Preferably, the conductive material has a specific electrical resistance of less than $10^{-1}$, less than $10^{-2}$, less than $10^{-3}$, less than $10^{-5}$, or less than $10^{-6}$ $\Omega$m. Most preferably, the specific electrical resistance of the conductive material is less than $5 \times 10^{-7}$ $\Omega$m or is less than $1 \times 10^{-7}$ $\Omega$m, particularly in the range of the specific electrical resistance of aluminum.

Further embodiments of the present invention refer to the nature of the light beam which propagates from the object to the detector. The light beam might be admitted by the object itself, i.e. might originate from the object. Additionally or alternatively, another origin of the light beam is feasible. Thus, one or more illumination sources might be provided which may illuminate the object, such as by using one or more primary rays or beams, such as one or more primary rays or beams having a predetermined characteristic. In the latter case, the light beam propagating from the object to the detector might be a light beam which is reflected by the object and/or a reflection device connected to the object. Thus, the object might be illuminated by using an illumination source generating primary light, wherein the object elastically or inelastically reflects the primary light, thereby generating the light beam propagating to the detector. The illumination source itself may be part of the detector. Thus, the detector may comprise at least one illumination source. Herein, the illumination source generally may be selected from: an illumination source, which is at least partly connected to the object and/or is at least partly identical to the object; an illumination source which is designed to at least partly illuminate the object with a primary radiation, preferably primary light, wherein the light beam preferably is generated by a reflection of the primary radiation on the object and/or by light emission by the object itself, stimulated by the primary radiation. Further, the illumination source may be a structured light source which may be capable of modifying an impinging light beam in a manner that a defined pattern may be projected onto the at least one optical sensor.

As used herein, the term "light" generally refers to electromagnetic radiation in one or more of the visible spectral range, the ultraviolet spectral range and the infrared spectral range. Therein, the term visible spectral range generally refers to a spectral range of 380 nm to 780 nm. The term infrared (IR) spectral range generally refers to electromagnetic radiation in the range of 780 nm to 1000 μm, preferably in the range of 780 nm to 3.0 μm. The term ultraviolet spectral range generally refers to electromagnetic radiation in the range of 1 nm to 380 nm, preferably in the range of 100 nm to 380 nm. Preferably, light as used within the present invention is visible light, i.e. light in the visible spectral range.

The term light beam generally refers to an amount of light emitted into a specific direction. Thus, the light beam may be a bundle of the light rays having a predetermined extension in a direction perpendicular to a direction of propagation of the light beam. Preferably, the light beam may be or may comprise one or more Gaussian light beams which may be characterized by one or more Gaussian beam parameters, such as one or more of a beam waist, a Rayleigh-length or any other beam parameter or combination of beam parameters suited to characterize a development of a beam diameter and/or a beam propagation in space.

As outlined above, the at least one sensor signal, given the same total power of the illumination by the light beam, is dependent on a beam cross-section of the light beam in the sensor region of the at least one optical sensor. As used herein, the term "beam cross-section" generally refers to a lateral extension of the light beam or a light spot generated by the light beam at a specific location. In case a circular light spot is generated, a radius, a diameter or a Gaussian beam waist or twice the Gaussian beam waist may function as a measure of the beam cross-section. In case non-circular light-spots are generated, the cross-section may be determined in any other feasible way, such as by determining the cross-section of a circle having the same area as the non-circular light spot, which is also referred to as the equivalent beam cross-section.

Thus, given the same total power of the illumination of the sensor region by the light beam, a light beam having a first beam diameter or beam cross-section may generate a first sensor signal, whereas a light beam having a second beam diameter or beam-cross section being different from the first beam diameter or beam cross-section generates a second sensor signal which may be different from the first sensor signal. Thus, by comparing the sensor signals, at least one item of information on the beam cross-section, specifically on the beam diameter, may be generated. For details of this effect, reference may be made to WO 2012/110924 A1.

Specifically in case one or more beam properties of the light beam propagating from the object to the detector are known, the at least one item of information on the longitudinal position of the object may thus be derived from a known relationship between the at least one sensor signal and a position of the object. The known relationship may be stored in the evaluation device as an algorithm and/or as one or more calibration curves. As an example, specifically for Gaussian beams, a relationship between a beam diameter or beam waist and a position of the object may easily be derived by using the Gaussian relationship between the beam waist and a longitudinal coordinate. This effect, as disclosed in WO 2012/110924 A1, is also referred to as the "FiP-effect" and may depend on or may be emphasized by an appropriate modulation of the light beam. Thus, preferably, the detector may furthermore have at least one modulation device for modulating the illumination. The detector may be designed to detect at least two sensor signals in the case of different modulations, in particular at least two sensor signals at respectively different modulation frequencies. In this case, the evaluation device may be designed to generate the at least one item of information on the longitudinal position of the object by evaluating the at least two sensor signals. Generally, the optical sensor may be designed in such a way that the at least one sensor signal, given the same total power of the illumination, is dependent on a modulation frequency of a modulation of the illumination. This property of frequency dependency is specifically provided in DSCs and, more preferably, in sDSCs. However, other types of optical sensors, preferably photo detectors and, more preferably, organic photo detectors may also exhibit this effect.

Preferably, the at least one optical sensor is a thin film device, having a layer setup of layer including electrode and photovoltaic material, the layer setup having a thickness of preferably no more than 1 mm, more preferably of at most 500 µm or even less. Thus, the sensor region of the optical sensor preferably may be or may comprise a sensor area, which may be formed by a surface of the respective device, wherein the surface may face towards the object or may face away from the object. Hereby, it may further be feasible to arrange the at least one optical sensor in a way that some surfaces comprising the sensor regions may face towards the object where other surfaces may face away from the object. Such a kind of arrangement of the respective devices, which might be helpful to optimize the path of the light beam through the stack and/or to reduce reflections within the light path, may, for any reason or purpose, be implemented in an alternating manner, such as with one, two, three or more devices where the sensor regions may face towards the object alternating with one, two, three or more other devices where the sensor regions may face away from the object.

Preferably, the sensor region of the optical sensor may be formed by one continuous sensor region, such as one continuous sensor area or sensor surface per device. Thus, preferably, the sensor region of the optical sensor may be formed by exactly one continuous sensor region. The sensor signal preferably is a uniform sensor signal for the entire sensor region of the optical sensor. Thereby, the at least one optical sensor may have a sensor region providing a sensitive area, also referred to as a sensor area, of at least 1 mm$^2$, preferably of at least 5 mm$^2$, such as a sensor area of 5 mm$^2$ to 1000 cm$^2$, preferably a sensor area of 7 mm$^2$ to 100 cm$^2$, more preferably a sensor area of 1 cm$^2$. The sensor area preferably has a rectangular geometry, such as a square geometry. The at least one sensor region can comprise for example at least one sensor area, that is to say a sensor region whose lateral extent considerably exceeds the thickness of the sensor region, for example by at least a factor of 10, preferably by at least a factor of 100 and particularly preferably by at least a factor of 1000. However, other geometries and/or sensor areas are feasible.

The sensor signal preferably may be selected from the group consisting of a current (such as a photocurrent) and a voltage (such as a photo voltage) or any signal derived thereof, such as a quotient of currents and/or voltages. Further, sensor signals may be preprocessed, in order to derive refined sensor signals from raw sensor signals, such as by averaging and/or filtering. The sensor region can thus be the smallest unit of the optical sensor for which a uniform signal, for example, an electrical signal, is generated, which preferably can no longer be subdivided to partial signals, for example for partial regions of the sensor region. The sensor can have one or else a plurality of such sensor regions, the latter case for example by a plurality of such sensor regions being arranged in a two-dimensional and/or three-dimensional matrix arrangement.

Generally, the optical sensor may comprise at least one semiconductor detector, in particular an organic semiconductor detector comprising at least one organic material, preferably an organic solar cell and particularly preferably a dye solar cell or dye-sensitized solar cell, in particular a solid dye solar cell or a solid dye-sensitized solar cell. Preferably, the optical sensor is or comprises a DSC or sDSC. Thus, preferably, the optical sensor comprises at least one first electrode, at least one n-semiconducting metal oxide, at least one dye, at least one p-semiconducting organic material, preferably a solid p-semiconducting organic material, and at least one second electrode. In a preferred embodiment, the optical sensor comprises at least one DSC or, more preferably, at least one sDSC. As outlined above, preferably, the at least one optical sensor is a transparent optical sensor or comprises at least one transparent optical sensor. Thus, preferably, both the first electrode and the second electrode are transparent.

The optical sensor may exhibit a shape which may be selected from the group comprising a planar, a planar-convex, a planar-concave, a biconvex, a biconcave, or any other form which may be employed for optical purposes, such as lenses or prisms. Herein, the substrates may be rigid or else flexible. Suitable substrates are, as well as metal foils, in particular plastic sheets or films and especially glass sheets or glass films. Shape-changing materials, such as shape-changing polymers, constitute an example of materials which may preferentially be employed as flexible substrates. Furthermore, the substrate may be covered or coated, in particular, for the purpose of reducing and/or modifying reflections of the incident light beam. As an example, the substrate may be shaped in a manner that it might exhibit a mirror effect, such as that of a dichroic mirror, which might particularly be useful in a setup where a splitting of the optical axis behind the substrate may be required for any purpose.

Even if the beam properties of the light beam propagating from the object to the detector are known fully or partially, it is known that, in many beams, the beam cross-section narrows before reaching a focal point and, afterwards, widens again. Thus, before and often as a focal point in which the light beam has the narrowest beam cross-section, positions along the axis of propagation of the light beam occur in which the light beam has the same cross-section. Thus, as an example, at a distance $z_0$ before and after the focal point, the cross-section of the light beam is identical. Therefore, WO 2014/097181 A1 proposes a stack of a number of separate longitudinal optical sensors which may generate a plurality of longitudinal sensor signals to be used by the evaluation device in order to resolve an ambiguity in a known relationship between a beam cross-section of the light beam and the longitudinal position of the object. However, since a stack of a number of optical sensors may not be suitable under various circumstances, only one optical sensor may be used for determining the longitudinal position of the object. Herein, a specific cross-section of the light beam might be determined, in case the overall power or intensity of the light beam is known. By using this information, the distance $z_0$ of the respective optical sensor from the focal point might, thus, still be determined. However, in order to determine whether the respective optical sensor is located before or behind the focal point, additional information may be required, such as a history of movement of the object and/or the detector and/or information on whether the detector is located before or behind the focal point.

Thus, generally, the evaluation device may be adapted to recognize whether the light beam widens or narrows, by taking this additional information into account. In addition to the at least one longitudinal coordinate of the object, at least one transversal coordinate of the object may be determined. Thus, generally, the evaluation device may further be adapted to determine at least one transversal coordinate of the object by determining a position of the light beam on the at least one optical sensor.

Further preferred embodiments refer to the evaluation device. Thus, the evaluation device may be designed to generate the at least one item of information on the longitudinal position of the object from at least one predefined relationship between the geometry of the illumination and a relative positioning of the object with respect to the detector, preferably taking account of a known power of the illumination and optionally taking account of a modulation frequency with which the illumination is modulated. Generally, as outlined above, the evaluation device may be adapted to generate the at least one item of information on the longitudinal position of the object by determining a diameter of the light beam from the at least one sensor signal. As used herein and as used in the following, the diameter of the light beam or, equivalently, a beam waist of the light beam might be used to characterize the beam cross-section of the light beam at a specific location. As outlined above, a known relationship might be used between the longitudinal position of the object and the beam cross-section in order to determine the longitudinal position of the object by evaluating the at least one sensor signal. As an example, a Gaussian relationship might be used, assuming that the light beam propagates at least approximately in a Gaussian Manner. For this purpose, the light beam might be shaped appropriately, such as by using an illumination source generating a light beam having known propagation properties, such as a known Gaussian profile. For this purpose, the illumination source itself may generate the light beam having the known properties, which, for example, is the case for many types of lasers, as the skilled person knows. Additionally or alternatively, the illumination source and/or the detector may have one or more beam-shaping elements, such as one or more lenses and/or one or more diaphragms, in order to provide a light beam having known properties, as the skilled person will recognize. Thus, as example, one or more transfer elements may be provided, such as one or more transfer elements having known beam-shaping properties. Additionally or alternatively, the illumination source and/or the detector, such as the at least one optional transfer element, may have one or more filters, such as one or more filter elements for filtering out wavelengths outside an excitation maximum of the at least one optical sensor. Thus, generally, the evaluation device may be adapted to compare the beam cross-section and/or the diameter of the light beam with known beam properties of the light beam in order to determine the at least one item of information on the longitudinal position of the object, preferably from a known dependency of a beam diameter of the light beam on at least one propagation coordinate in a direction of propagation of the light beam and/or from a known Gaussian profile of the light beam.

In a specific embodiment of the present invention as described above in more detail, wherein the detector may be designed to detect at least two sensor signals, in particular, in the case wherein the detector may be impinged by at least two different wavelengths, preferably by employing at least two separate photo detectors, the evaluation device may be designed to generate two or more items of information on the longitudinal position of the object by evaluating the at least two sensor signals originating from the at least two photo detectors.

Generally, the detector may further comprise at least one imaging device, i.e. a device capable of acquiring at least one image. The imaging device can be embodied in various ways. Thus, the imaging device can be for example part of the detector in a detector housing. Alternatively or additionally, however, the imaging device can also be arranged outside the detector housing, for example as a separate imaging device, independent from the at least one optical sensor. Additionally or alternatively, the at least one optional imaging device may fully or partially be integrated into the optical sensor, such as being connected to the detector or even be part of the detector. However, other arrangements are possible.

As used herein, an "imaging device" is generally understood as a device which can generate a one-dimensional, a two-dimensional, or a three-dimensional image of the object or of a part thereof. In particular, the detector, with or without the at least one optional imaging device, can be completely or partly used as a camera, such as an IR camera, or an RGB camera, i.e. a camera which is designed to deliver three basic colors which are designated as red, green, and blue, on three separate connections. Thus, as an example, the at least one imaging device may be or may comprise at least one imaging device selected from the group consisting of: a pixelated organic camera element, preferably a pixelated organic camera chip; a pixelated inorganic camera element, preferably a pixelated inorganic camera chip, more preferably a CCD- or CMOS-chip; a monochrome camera element, preferably a monochrome camera chip; a multicolor camera element, preferably a multicolor camera chip; a full-color camera element, preferably a full-color camera chip. The imaging device may be or may comprise at least one device selected from the group consisting of a monochrome imaging device, a multi-chrome imaging device and at least one full color imaging device. A multi-chrome imaging device and/or a full color imaging device may be generated by using filter techniques and/or by using intrinsic color sensitivity or other techniques, as the skilled person will recognize. Other embodiments of the imaging device are also possible.

The imaging device may be designed to image a plurality of partial regions of the object successively and/or simultaneously. By way of example, a partial region of the object can be a one-dimensional, a two-dimensional, or a three-dimensional region of the object which is delimited for example by a resolution limit of the imaging device and from which electromagnetic radiation emerges. In this context, imaging should be understood to mean that the electromagnetic radiation which emerges from the respective partial region of the object is fed into the imaging device, for example by means of the at least one optional transfer device of the detector. The electromagnetic rays can be generated by the object itself, for example in the form of a luminescent radiation. Alternatively or additionally, the at least one detector may comprise at least one illumination source for illuminating the object.

In particular, the imaging device can be designed to image sequentially, for example by means of a scanning method, in particular using at least one row scan and/or line scan, the plurality of partial regions sequentially. However, other embodiments are also possible, for example embodiments in which a plurality of partial regions is simultaneously imaged. The imaging device is designed to generate, during this imaging of the partial regions of the object, signals, preferably electronic signals, associated with the partial regions. The signal may be an analogue and/or a digital signal. By way of example, an electronic signal can be associated with each partial region. The electronic signals can accordingly be generated simultaneously or else in a temporally staggered manner. By way of example, during a row scan or line scan, it is possible to generate a sequence of electronic signals which correspond to the partial regions of the object, which are strung together in a line, for example. Further, the imaging device may comprise one or more signal processing devices, such as one or more filters and/or analogue-digital-converters for processing and/or preprocessing the electronic signals.

In addition, the detector may comprise at least one transfer device, such as an optical lens, in particular a focus-tunable lens, which will be described later in more detail, and which may further be arranged along the common optical axis. By way of example, the light beam which emerges from the object may in this case travel first through the at least one transfer device and thereafter through the optical sensor until it finally impinges on an imaging device. The feeding of the light to the optical sensor can be effected in particular in such a way that a light spot, for example having a round, oval or differently configured cross section, is produced on the optional sensor area of the optical sensor. By way of example, the detector can have a visual range, in particular a solid angle range and/or spatial range, within which objects can be detected. Preferably, the optional transfer device is designed in such a way that the light spot, for example in the case of an object arranged within a visual range of the detector, is arranged completely on the sensor region, in particular the sensor area. By way of example, a sensor area can be chosen to have a corresponding size in order to ensure this condition.

In a preferred embodiment, the at least one object might be illuminated by using at least one illumination source which generates primary light, wherein the at least one object elastically or inelastically reflects the primary light, thereby generating a plurality of light beams which propagate to one of the at least two detectors. The at least one illumination source may form or may not form a constituent part of each of the at least two detectors which. Thus, the at least one illumination source may be formed independently of the at least two detectors and may, therefore, particularly be located in at least one position which is separated from the at least two detectors. By way of example, the at least one illumination source itself may be or may comprise an ambient light source and/or may be or may comprise an artificial illumination source. This embodiment is preferably suited for an application in which at least two detectors, preferentially two identical detectors, are employed for acquiring depth information, in particular, for the purpose to providing a measurement volume which extends the inherent measurement volume of a single detector.

As outlined above, preferably, for potential details of the setups of the at least one optical detector, reference may be made to WO 2012/110924 A1 and/or to WO 2014/097181 A1, specifically with regard to potential electrode materials, organic materials, inorganic materials, layer setups, optional transfer devices, optional illumination sources and further details. Still, other embodiments are feasible.

In a further preferred embodiment, the detector according to the present invention may comprise at least two individual optical sensors, preferably two or three individual optical sensors, which may be placed at two distinct locations. Within this regard, the individual optical sensor may, preferably, be spaced apart from the other individual optical sensors comprised by the detector in order to allow acquiring an individual image which may differ from the images taken by the other individual optical sensors. In particular, the individual optical sensors may be arranged in separate beam paths in a collimated arrangement in order to generate a single circular, three-dimensional image. Thus, the individual optical sensors may be aligned in a manner that they are located parallel to the optical axis and may, in addition, exhibit an individual displacement in an orientation perpendicular to the optical axis of the detector. Herein, an alignment may be achieved by adequate measures, such as by adjusting a location and orientation of the individual optical sensor and/or the corresponding transfer element. Thus, the two individual optical sensors may, preferably, be spaced apart in a manner that they may be able to generate or increase a perception of depth information, especially in a fashion that the depth information may be obtained by combining visual information as derived from the two individual optical sensors having overlapping fields of view, such the visual information as obtained by binocular vision. For this purpose, the individual optical sensors may, preferably be spaced apart from each other by a distance from 1 cm to 100 cm, preferably from 10 cm to 25 cm, as determined in the direction perpendicular to the optical axis. As used herein, the detector as provided in this embodiment may, in particular, be part of a "stereoscopic system" which will be described below in more detail. Besides allowing stereoscopic vision, further particular advantages of the stereoscopic system which are primarily based on a use of more than one optical sensor may, in particular, include an increase of the total intensity and/or a lower detection threshold.

Particularly in order to generate the at least one item of information on the longitudinal position of the object, the individual optical sensors as described above each may be or comprise a FiP sensor, which may also be denominated as a "longitudinal optical sensor", in particular, the FiP sensors as disclosed in WO 2012/110924 A1 or WO 2014/097181 A1. Within this regard, the FiP sensors may, preferably, be operated in a modulation mode, wherein each of the FiP sensors may be sensitive to an individual modulation frequency, thus, allowing a simple distinction between the sensor signals as generated by the different FiP sensors. As a result, it may, therefore, be possible to determine the longitudinal position of the object by applying spectroscopic vision by using the two individual FiP sensors having a discrete modulation and being spaced apart in a manner that the depth information may be acquired by simply combining the visual information recorded by the two individual optical sensors which, as a consequence of their arrangement, exhibit overlapping fields of view.

In order to further generate also the at least one item of information on the transversal position of the object, a third individual optical sensor which may be capable of providing a transversal sensor signal may, preferably, be employed. As used herein, this kind of sensor may also be denominated as "transversal optical sensor". Herein, the transversal optical sensor may be a separate optical sensor which may, preferably, be placed into the same beam path of one of the two longitudinal optical sensors. Alternatively, the third individual optical sensor may be or comprise one of the mentioned longitudinal optical sensors which may be placed into a separate third beam path, wherein the third beam path may be parallel to the preferably parallel beam paths of the other two individual optical sensors but exhibit an individual displacement perpendicular to the mentioned beam paths.

Irrespective of the arrangement of the transversal optical sensor, the transversal optical sensor may be a position sensitive device being adapted to determine an item of information on a one-dimensional or a two dimensional position of the object in a direction transversal to the optical axis of the detector. Herein, the position sensitive device may be one of an analog position sensitive device or a discrete position sensitive device. The analog position sensitive device usually comprises a sensor area adapted to be illuminated by the incident beam, wherein the sensor area may be formed by one continuous sensor area which, preferably, exhibits a uniform resistance over the entire sensor area of at least 1 mm$^2$ to 1000 cm$^2$, preferably a sensor area of 10 mm$^2$ to 100 cm$^2$, more preferably a sensor area of 1 cm$^2$. Preferably, the sensor area may exhibit a rectangular geometry, such as a square geometry. Thus, the sensor area may have a lateral extent which considerably exceeds the thickness of the sensor area, for example by at least a factor of 10, preferably of 100, particularly preferred of 1000. However, other kinds of sensor areas are feasible. The sensor signal may, preferably, be selected from the group consisting of a current, in particular a photocurrent, and a voltage, in particular a photo voltage, or any signal derived thereof, such as a quotient of currents and/or voltages. Further, sensor signals may be preprocessed, in order to acquire derived sensor signals from raw sensor signals, such as by averaging and/or filtering. By comparing pairs of the sensor signals a location of a light spot on the sensor area as generated by the incident beam may be derived.

Advantageously, the analog position sensitive device may allow continuously determining the location of the light spots with measuring rates up to rates of 100 kHz or more, thereby being substantially independent of the size of the light spots. However, since the sensor signal of the analog position sensitive device may exhibit a non-linear dependency on the location and may, further, depend on a form of the light spot, a discrete position sensitive device, in particular a known CMOS chip or a known CCD chip, which comprise a matrix of individual sensor pixels, may, therefore, be preferred. Herein, the signal of individual sensor pixels or, preferably, of columns or rows of individual sensor pixels may be compared with a threshold, thus, allowing a determination of the location of the light spot on the discrete position sensitive device.

In a further alternative, the transversal optical sensor and the at least one longitudinal optical sensor may, preferably, at least partially be integrated into a combined optical sensor, such as the combined optical sensor as disclosed in WO 2014/097181 A1 or in the European patent application number 14 196 942.8.

Further, the detector may, preferably, comprise a single evaluation device designed to generate the item of information on the position of the object by evaluating any or all sensor signals which might be received from any or all of the optical sensors as comprised by the detector. However, particularly depending on the arrangement of the optical sensors and their respective purposes, the detector may, alternatively, comprise an individual evaluation device assigned to some or each of the optical sensors comprised by the detector. Further, whereas in conventional stereoscopic systems which comprise at least two conventional position sensitive devices corresponding pixels in the respective images have to be determined by applying considerable computational effort, in the stereoscopic system according to the present invention which comprises at least two FiP sensors the corresponding pixels in the respective images as recorded by using the FiP sensors, wherein each of the FiP sensors may be operated with a different modulation frequency, may apparently be assigned with respect to each other. Thus, it may be emphasized that by using one or more FiP sensors, the at least one item of information on the longitudinal position of the object may be generated with reduced effort.

A further aspect of the present invention makes use of at least two detectors according to the present invention, wherein each of such detectors may be selected as of at least one detector according to one or more of the embodiments disclosed above or disclosed in further detail below. Thus, for optional embodiments, reference might be made to the respective embodiments of the detector.

In a further aspect of the present invention, a human-machine interface for exchanging at least one item of information between a user and a machine is proposed. The human-machine interface as proposed may make use of the fact that the above-mentioned detector in one or more of the embodiments mentioned above or as mentioned in further detail below may be used by one or more users for providing information and/or commands to a machine. Thus, preferably, the human-machine interface may be used for inputting control commands. The human-machine interface comprises at least one detector according to the present invention, such as according to one or more of the embodiments disclosed above and/or according to one or more of the embodiments as disclosed in further detail below, wherein the human-machine interface is designed to generate at least one item of geometrical information of the user by means of the detector wherein the human-machine interface is designed to assign to the geometrical information at least one item of information, in particular at least one control command.

Generally, as used herein, the at least one item of geometrical information of the user may imply one or more items of information on a transversal position and/or on a longitudinal position of the user and/or one or more body parts of the user. Thus, preferably, the geometrical information of the user may imply one or more items of information on a transversal position and/or a longitudinal position as provided by the evaluation device of the detector. The user, a body part of the user or a plurality of body parts of the user may be regarded as one or more objects which may be detected by the at least one detector. Therein, precisely one detector may be provided, or a combination of a plurality of detectors may be provided. As an example, a plurality of detectors may be provided for determining positions of a plurality of body parts of the user and/or for determining an orientation of at least one body part of the user. The human-machine interface may comprise one or more detectors, wherein, in case a plurality of detectors is provided, the detectors may be identical or may differ. Herein, in case a plurality of detectors is used, the plurality of detectors, particularly the plurality of identical detectors, still allows for a reliable acquisition of depth information about the at least one object in an overlapping volume which may be recorded, as described above, by the plurality of detectors. Thus, preferably, the at least one item of geometrical information of the user is selected from the group consisting of: a position of a body of the user; a position of at least one body part of the user; an orientation of a body of the user; an orientation of at least one body part of the user.

In a further aspect of the present invention, an entertainment device for carrying out at least one entertainment function is disclosed. As used herein, an entertainment device is a device which may serve the purpose of leisure and/or entertainment of one or more users, in the following also referred to as one or more players. As an example, the entertainment device may serve the purpose of gaming, preferably computer gaming. Additionally or alternatively, the entertainment device may also be used for other purposes, such as for exercising, sports, physical therapy or motion tracking in general. Thus, the entertainment device may be implemented into a computer, a computer network or a computer system or may comprise a computer, a computer network or a computer system which runs one or more gaming software programs.

The entertainment device comprises at least one human-machine interface according to the present invention, such as according to one or more of the embodiments disclosed above and/or according to one or more of the embodiments disclosed below. The entertainment device is designed to enable at least one item of information to be input by a player by means of the human-machine interface. The at least one item of information may be transmitted to and/or may be used by a controller and/or a computer of the entertainment device. The at least one item of information preferably may comprise at least one command adapted for influencing the course of a game. Thus, as an example, the at least one item of information may include at least one item of information on at least one of a movement, the orientation and a position of the player and/or of one or more body parts of the player, thereby allowing for the player to simulate a specific position and/or action required for gaming. As an example, one or more of the following movements may be simulated and communicated to a controller and/or a computer of the entertainment device: dancing; running; jumping; swinging of a racket; swinging of a bat; swinging of a club; pointing of an object towards another object, such as pointing of a toy gun towards a target.

The entertainment device, preferably a controller and/or a computer of the entertainment device, is designed to vary the entertainment function in accordance with the information. Thus, as outlined above, a course of a game might be influenced in accordance with the at least one item of information. Thus, the entertainment device might include one or more controllers which might be separate from the evaluation device of the at least one detector and/or which might be fully or partially identical to the at least one evaluation device or which might even include the at least one evaluation device. Preferably, the at least one controller might include one or more data processing devices, such as one or more computers and/or microcontrollers.

In a further aspect of the present invention, a tracking system for tracking the position of at least one movable object is provided. As used herein, a tracking system is a device which is adapted to gather information on a series of past positions of the at least one object or at least one part of an object. Additionally, the tracking system may be adapted to provide information on at least one predicted future position of the at least one object or the at least one part of the object. The tracking system may have at least one track controller, which may fully or partially be embodied as an electronic device, preferably as at least one data processing device, more preferably as at least one computer or microcontroller. Again, the at least one track controller may comprise the at least one evaluation device and/or may be part of the at least one evaluation device and/or may fully or partially be identical to the at least one evaluation device.

The tracking system comprises at least one detector according to the present invention, such as at least one detector as disclosed in one or more of the embodiments listed above and/or as disclosed in one or more of the embodiments below. The tracking system further comprises at least one track controller. The tracking system may comprise one, two or more detectors, particularly two or more identical detectors, which allow for a reliable acquisition of depth information about the at least one object in an overlapping volume between the two or more detectors. The track controller is adapted to track a series of positions of the object, each position comprising at least one item of information on a transversal position of the object at a specific point in time and at least one item of information on a longitudinal position of the object at a specific point in time. The tracking system may be adapted to initiate one or more actions of the tracking system itself and/or of one or more separate devices. For the latter purpose, the tracking system, preferably the track controller, may have one or more wireless and/or wire-bound interfaces and/or other types of control connections for initiating at least one action. Preferably, the at least one track controller may be adapted to initiate at least one action in accordance with at least one actual position of the object. As an example, the action may be selected from the group consisting of: a prediction of a future position of the object; pointing at least one device towards the object; pointing at least one device towards the detector; illuminating the object; illuminating the detector.

As an example of application of a tracking system, the tracking system may be used for continuously pointing at least one first object to at least one second object even though the first object and/or the second object might move. Potential examples, again, may be found in industrial applications, such as in robotics and/or for continuously working on an article even though the article is moving, such as during manufacturing in a manufacturing line or assembly line. Additionally or alternatively, the tracking system might be used for illumination purposes, such as for continuously illuminating the object by continuously pointing an illumination source to the object even though the object might be moving. Further applications might be found in communication systems, such as in order to continuously transmit information to a moving object by pointing a transmitter towards the moving object.

In a further aspect of the present invention, a scanning system for determining at least one position of at least one object is provided. As used herein, the scanning system is a device which is adapted to emit at least one light beam being configured for an illumination of at least one dot located at at least one surface of the at least one object and for generating at least one item of information about the distance between the at least one dot and the scanning system. For the purpose of generating the at least one item of information about the distance between the at least one dot and the scanning system, the scanning system comprises at least one of the detectors according to the present invention, such as at least one of the detectors as disclosed in one or more of the embodiments listed above and/or as disclosed in one or more of the embodiments below.

Thus, the scanning system comprises at least one illumination source which is adapted to emit the at least one light beam being configured for the illumination of the at least one dot located at the at least one surface of the at least one object. As used herein, the term "dot" refers to a small area on a part of the surface of the object which may be selected, for example by a user of the scanning system, to be illuminated by the illumination source. Preferably, the dot may exhibit a size which may, on one hand, be as small as possible in order to allow the scanning system determining a value for the distance between the illumination source comprised by the scanning system and the part of the surface of the object on which the dot may be located as exactly as possible and which, on the other hand, may be as large as possible in order to allow the user of the scanning system or the scanning system itself, in particular by an automatic procedure, to detect a presence of the dot on the related part of the surface of the object.

For this purpose, the illumination source may comprise an artificial illumination source, in particular at least one laser source and/or at least one incandescent lamp and/or at least one semiconductor light source, for example, at least one light-emitting diode, in particular an organic and/or inorganic light-emitting diode. On account of their generally defined beam profiles and other properties of handleability, the use of at least one laser source as the illumination source is particularly preferred. Herein, the use of a single laser source may be preferred, in particular in a case in which it may be important to provide a compact scanning system that might be easily storable and transportable by the user. The illumination source may thus, preferably be a constituent part of the detector and may, therefore, in particular be integrated into the detector, such as into the housing of the detector. In a preferred embodiment, particularly the housing of the scanning system may comprise at least one display configured for providing distance-related information to the user, such as in an easy-to-read manner. In a further preferred embodiment, particularly the housing of the scanning system may, in addition, comprise at least one button which may be configured for operating at least one function related to the scanning system, such as for setting one or more operation modes. In a further preferred embodiment, particularly the housing of the scanning system may, in addition, comprise at least one fastening unit which may be configured for fastening the scanning system to a further surface, such as a rubber foot, a base plate or a wall holder, such comprising as magnetic material, in particular for increasing the accuracy of the distance measurement and/or the handleability of the scanning system by the user.

In a particularly preferred embodiment, the illumination source of the scanning system may, thus, emit a single laser beam which may be configured for the illumination of a single dot located at the surface of the object. By using at least one of the detectors according to the present invention at least one item of information about the distance between the at least one dot and the scanning system may, thus, be generated. Hereby, preferably, the distance between the illumination source as comprised by the scanning system and the single dot as generated by the illumination source may be determined, such as by employing the evaluation device as comprised by the at least one detector. However, the scanning system may, further, comprise an additional evaluation system which may, particularly, be adapted for this purpose. Alternatively or in addition, a size of the scanning system, in particular of the housing of the scanning system, may be taken into account and, thus, the distance between a specific point on the housing of the scanning system, such as a front edge or a back edge of the housing, and the single dot may, alternatively, be determined.

Alternatively, the illumination source of the scanning system may emit two individual laser beams which may be configured for providing a respective angle, such as a right angle, between the directions of an emission of the beams, whereby two respective dots located at the surface of the same object or at two different surfaces at two separate objects may be illuminated. However, other values for the respective angle between the two individual laser beams may also be feasible. This feature may, in particular, be employed for indirect measuring functions, such as for deriving an indirect distance which may not be directly accessible, such as due to a presence of one or more obstacles between the scanning system and the dot or which may otherwise be hard to reach. By way of example, it may, thus, be feasible to determine a value for a height of an object by measuring two individual distances and deriving the height by using the Pythagoras formula. In particular for being able to keep a predefined level with respect to the object, the scanning system may, further, comprise at least one leveling unit, in particular an integrated bubble vial, which may be used for keeping the predefined level by the user.

As a further alternative, the illumination source of the scanning system may emit a plurality of individual laser beams, such as an array of laser beams which may exhibit a respective pitch, in particular a regular pitch, with respect to each other and which may be arranged in a manner in order to generate an array of dots located on the at least one surface of the at least one object. For this purpose, specially adapted optical elements, such as beam-splitting devices and mirrors, may be provided which may allow a generation of the described array of the laser beams.

Thus, the scanning system may provide a static arrangement of the one or more dots placed on the one or more surfaces of the one or more objects. Alternatively, illumination source of the scanning system, in particular the one or more laser beams, such as the above described array of the laser beams, may be configured for providing one or more light beams which may exhibit a varying intensity over time and/or which may be subject to an alternating direction of emission in a passage of time. Thus, the illumination source may be configured for scanning a part of the at least one surface of the at least one object as an image by using one or more light beams with alternating features as generated by the at least one illumination source of the scanning device. In particular, the scanning system may use at least one row scan and/or line scan, such as to scan the one or more surfaces of the one or more objects sequentially or simultaneously.

As the scanning system according to the present invention is not based on a time of flight measurement, in particular, the measurement of the time difference between sending a modulated light signal and receiving the reflected signal, scanning devices according to the present invention may use an illumination source that is independent of the scanning system, such as movable independent of the rest of the scanning system even during the measurement. Further, the scanning system according to the present invention may be used in a highly reflective environment, such as environments with metallic surfaces such as steel, stainless steel, aluminum, chromium, or other reflective or partially reflective surfaces, such as production environments. In such highly reflective environments, time of flight measurements are difficult since the signal send out by the illumination source of the time of flight camera may be reflected back to the camera directly and indirectly, leading to an erroneous signal. The scanning system according to the present invention determines where the scattered light of the illumination source is in focus, and is therefore less prone to errors when light reflections are present.

In a further aspect of the present invention, a stereoscopic system for generating at least one single circular, three-dimensional image of at least one object is provided. As used herein, the stereoscopic system as disclosed above and/or below may comprise at least two of the FiP sensors as the optical sensors, wherein a first FiP sensor may be comprised in a tracking system, in particular in a tracking system according to the present invention, while a second FiP sensor may be comprised in a scanning system, in particular in a scanning system according to the present invention. Herein, the FiP sensors may, preferably, be arranged in separate beam paths in a collimated arrangement, such as by aligning the FiP sensors parallel to the optical axis and individually displaced perpendicular to the optical axis of the stereoscopic system. Thus, the FiP sensors may be able to generate or increase a perception of depth information, especially, by obtaining the depth information by a combination of the visual information derived from the individual FiP sensors which have overlapping fields of view and are, preferably, sensitive to an individual modulation frequency. For this purpose, the individual FiP sensors may, preferably, be spaced apart from each other by a distance from 1 cm to 100 cm, preferably from 10 cm to 25 cm, as determined in the direction perpendicular to the optical axis. In this preferred embodiment, the tracking system may, thus, be employed for determining a position of a modulated active target while the scanning system which is adapted to project one or more dots onto the one or more surfaces of the one or more objects may be used for generating at least one item of information about the distance between the at least one dot and the scanning system. In addition, the stereoscopic system may further comprise a separate position sensitive device being adapted for generating the item of information on the transversal position of the at least one object within the image as described elsewhere in this application.

Besides allowing stereoscopic vision, further particular advantages of the stereoscopic system which are primarily based on a use of more than one optical sensor may, in particular, include an increase of the total intensity and/or a lower detection threshold. Further, whereas in a conventional stereoscopic system which comprises at least two conventional position sensitive devices corresponding pixels in the respective images have to be determined by applying considerable computational effort, in the stereoscopic system according to the present invention which comprises at least two FiP sensors the corresponding pixels in the respective images being recorded by using the FiP sensors, wherein each of the FiP sensors may be operated with a different modulation frequency, may apparently be assigned with respect to each other. Thus, it may be emphasized that the stereoscopic system according to the present invention may allow generating the at least one item of information on the longitudinal position of the object as well as on the transversal position of the object with reduced effort.

For further details of the stereoscopic system, reference may be made to the description of the tracking system and the scanning system, respectively.

In a further aspect of the present invention, a camera for imaging at least one object is disclosed. The camera comprises at least one detector according to the present invention, such as disclosed in one or more of the embodiments given above or given in further detail below. Thus, specifically, the present application may be applied in the field of photography. Thus, the detector may be part of a photographic device, specifically of a digital camera. Specifically, the detector may be used for 3D photography, specifically for digital 3D photography. Thus, the detector may form a digital 3D camera or may be part of a digital 3D camera. As used herein, the term "photography" generally refers to the technology of acquiring image information of at least one object. As further used herein, a "camera" generally is a device adapted for performing photography. As further used herein, the term "digital photography" generally refers to the technology of acquiring image information of at least one object by using a plurality of light-sensitive elements adapted to generate electrical signals indicating an intensity and/or color of illumination, preferably digital electrical signals. As further used herein, the term "3D photography" generally refers to the technology of acquiring image information of at least one object in three spatial dimensions. Accordingly, a 3D camera is a device adapted for performing 3D photography. The camera generally may be adapted for acquiring a single image, such as a single 3D image, or may be adapted for acquiring a plurality of images, such as a sequence of images. Thus, the camera may also be a video camera adapted for video applications, such as for acquiring digital video sequences.

Thus, generally, the present invention further refers to a camera, specifically a digital camera, more specifically a 3D camera or digital 3D camera, for imaging at least one object. As outlined above, the term imaging, as used herein, generally refers to acquiring image information of at least one object. The camera comprises at least one detector according to the present invention. The camera, as outlined above, may be adapted for acquiring a single image or for acquiring a plurality of images, such as image sequence, preferably for acquiring digital video sequences. Thus, as an example, the camera may be or may comprise a video camera. In the latter case, the camera preferably comprises a data memory for storing the image sequence.

For further information concerning the human-machine interface, the entertainment device, the tracking system, and the camera reference may be made to WO 2014/097181 A1, whose respective content is included here by reference.

In a further aspect of the present invention, a method for determining a position of at least one object is disclosed. Preferably, the method may make use of at least one detector according to the present invention, such as of at least one detector according to one or more of the embodiments disclosed above and/or below in further detail. Thus, for optional embodiments of the method, reference might be made to the embodiments of the detector. The method comprises the following steps, which may be performed in the given order or in a different order. Further, additional method steps might be provided which are not listed. Further, two or more or even all of the method steps might be performed at least partially simultaneously. Further, a method step might be performed twice or even more than twice, repeatedly.

According to a first method step, at least one optical sensor of a detector is used, wherein the optical sensor determines a position of at least one light beam traveling from the object to the detector. Herein the optical sensor has at least a first electrode and a second electrode, wherein at least one photovoltaic material is embedded in between the first electrode and the second electrode, wherein the photovoltaic material is adapted to generate electric charges in response to an illumination of the photovoltaic material with light. According to the present invention, the first electrode or the second electrode is a split electrode having at least three partial electrodes, wherein each partial electrode is adapted to generate at least one sensor signal, wherein the sensor signal is dependent on a beam cross-section of the light beam in a sensor region of the optical sensor.

According to a second method step, at least one evaluation device is used, wherein the evaluation device generates at least one item of information on a transversal position of the object, the transversal position being a position in at least one plane perpendicular an optical axis of the detector, by, preferably successively, evaluating the sensor signal of pairs of the partial electrodes. Further, the evaluation device generates at least one item of information on a longitudinal position of the object by evaluating a sum of the sensor signals of all partial electrodes.

In a further aspect of the present invention, a use of a detector according to the present invention is disclosed. Therein, a use of the detector for a purpose of use is proposed, selected from the group consisting of: a distance measurement, in particular in traffic technology; a position measurement, in particular in traffic technology; an entertainment application; a security application; a human-machine interface application; a tracking application; a scanning application; a tracking application; a stereoscopic vision application; a photography application; an imaging application or camera application; a mapping application for generating maps of at least one space. In addition, further uses of the optical detectors and devices, the detector system, the human-machine interface, the entertainment device, the tracking system, or the camera according to the present invention may be found in WO 2012/110924 A1 and/or in WO 2014/097181 A1, which purposes are herewith included by reference.

As outlined above, the at least one optical sensor can be designed for example in such a way that the sensor signal, given the same power of the illumination, that is to say for example given the same integral over the intensity of the illumination on the sensor area, is dependent on the geometry of the illumination, that is to say for example on the diameter and/or the equivalent diameter for the sensor spot. By way of example, the optical sensor can be designed in such a way that upon a doubling of the beam cross section given the same total power, a signal variation occurs by at least a factor of 3, preferably by at least a factor of 4, in particular a factor of 5 or even a factor of 10. This condition can hold true for example for a specific focusing range, for example for at least one specific beam cross section. Thus, by way of example, the sensor signal can have, between at least one optimum focusing at which the signal can have for example at least one global or local maximum and a focusing outside said at least one optimum focusing, a signal difference by at least a factor of 3, preferably by at least a factor of 4, in particular a factor of 5 or even a factor of 10. In particular, the sensor signal can have as a function of the geometry of the illumination, for example of the diameter or equivalent diameter of a light spot, at least one pronounced maximum, for example with a boost by at least a factor of 3, particularly preferably by at least a factor of 4 and particularly preferably by at least a factor of 10. Consequently, the optical sensor may be based on the above-mentioned FiP-effect, which is disclosed in great detail in WO 2012/110924 A1. Thus, specifically in sDSCs, the focusing of the light beam may play a decisive role, i.e. the cross-section or cross-sectional area on which a certain number of photons (nph) is incident. The more tightly the light beam is focused, i.e. the smaller its cross-section, the higher the photo current may be. The term 'FiP' expresses the relationship between the cross-section $\phi$ (Fi) of the incident beam and the solar cell's power (P). In particular, the at least one optical sensor can be designed in such a way that the sensor signal, given the same total power of the illumination, is substantially independent of a size of the sensor region, in particular of a size of the sensor area, in particular as long as the light spot of the illumination lies completely within the sensor region, in particular the sensor area. Consequently, the sensor signal can be dependent exclusively on a focusing of the electromagnetic rays on the sensor area. In particular, the sensor signal can be embodied in such a way that a photocurrent and/or a photo voltage per sensor area have/has the same values given the same illumination, for example the same values given the same size of the light spot.

The evaluation device can comprise in particular at least one data processing device, in particular an electronic data processing device, which can be designed to generate the at least one item of information on the transversal position and to generate the at least one item of information on the longitudinal position of the object by evaluating the at least one sensor signal. Thus, the evaluation device is designed to use the at least one sensor signal as input variables and to generate the items of information on the transversal position and the longitudinal position of the object by processing these input variables. The processing can be done in parallel, subsequently or even in a combined manner. The evaluation device may use an arbitrary process for generating these items of information, such as by calculation and/or using at least one stored and/or known relationship. Besides the at least one sensor signal, one or a plurality of further parameters and/or items of information can influence said relationship, for example at least one item of information about a modulation frequency. The relationship can be determined or determinable empirically, analytically or else semi-empirically. Particularly preferably, the relationship comprises at least one calibration curve, at least one set of calibration curves, at least one function or a combination of the possibilities mentioned. One or a plurality of calibration curves can be stored for example in the form of a set of values and the associated function values thereof, for example in a data storage device and/or a table. Alternatively or additionally, however, the at least one calibration curve can also be stored for example in parameterized form and/or as a functional equation. Separate relationships for processing the at least one sensor signal into the at least one item of information on the transversal position and into the at least one item of information on the longitudinal position may be used. Alternatively, at least one combined relationship for processing the sensor signal is feasible. Various possibilities are conceivable and can also be combined.

As outlined in more detail in WO 2012/110924 A1 and WO 2014/097181 A1, a cross-section of the light beam, resulting in a specific diameter or equivalent diameter of a light spot on the sensor region of the at least one optical sensor, can be dependent on a distance between the object and the detector and/or on the optional transfer device of the detector, for example at least one detector lens. By way of example, a variation of the distance between the object and a lens of the optional transfer device can lead to a defocusing of the illumination on the sensor region, accompanied by a change in the geometry of the illumination, for example a widening of a light spot, which can result in a correspondingly altered sensor signal. Even without a transfer device, by way of example, from a known beam profile from the sensor signal and/or a variation thereof, for example, by means of a known beam profile and/or a known propagation of the light beam, it is possible to deduce a defocusing and/or the geometrical information. By way of example, given a known total power of the illumination, it is thus possible to deduce from the sensor signal of the optical sensor a geometry of the illumination and therefrom in turn the geometrical information, in particular at least one item of location information of the object.

Similarly, the at least one optical sensor allows for an easy detection of a transversal position of the object. For this purpose, use may be made of the fact that a change in a transversal position of the object generally will lead to a change in a transversal position of the light beam in the sensor region of the at least one optical sensor. Thus, for example by detecting a transversal position of a light spot generated by the light beam impinging on a sensor region, such as a sensor area, of the optical sensor, the transversal position or at least one item of information on the transversal position of the object may be generated. Thus, the position of the light spot may be determined by comparing currents and/or voltage signals of partial electrodes of the transversal optical sensor, such as by forming at least one ratio of at least two currents through at least three different partial electrodes. For this measurement principle, as an example, reference may be made to U.S. Pat. No. 6,995,445 and/or US 2007/0176165 A1.

Therefore, the evaluation device is designed to generate at least one item of information on a transversal position of the object, wherein the transversal position is a position in at least one plane perpendicular to the optical axis of the detector. According to the present invention, the evaluation device is designed to generate the at least one item of information on the transversal position of the object by evaluating the sensor signal of pairs of the partial electrodes. Herein, the partial electrodes may be arranged on the optical sensor as described above and/or below. With particular regard to the present invention, the evaluation device may most preferably be designed to generate the item of information on the transversal position of the object by employing the following procedure:

first, by forming sums of the sensor signals of pairs of adjacent partial electrodes which may be located perpendicular to a selected direction within the plane, second, by forming at least one difference between the sums of the sensor signals of the pairs of the adjacent partial electrodes within the selected direction, and, third, by dividing the difference by the sum of the sensor signals of all partial electrodes.

Further, the evaluation device is designed to generate at least one item of information on the longitudinal position of the object by evaluating the sum of the sensor signals of all partial electrodes. This kind of evaluation may, preferably, be performed by equally employing the third step of the mentioned procedure, which, in particular, may allow saving a separate evaluation step and, thus, effort and time.

For actually performing the mentioned procedure, the evaluation device may, therefore, be equipped with suitable electronic devices, such as A-C converters, filters, (pre-)amplifiers, adders, subtractors, multipliers, dividers, splitters, and/or other electronic devices, which may be capable of processing the incoming sensor signals as required. For this purpose, the evaluation device may employ discrete electronics and/or may be or may comprise one or more integrated circuits, such as one or more application-specific integrated circuits (ASICs). Alternatively or in addition, the evaluation device may comprise one or more data processing devices, such as one or more computers, preferably one or more microcomputers and/or microcontrollers, which may be capable of performing one or more operations within the above-mentioned procedure. Furthermore, the evaluation device can comprise one or a plurality of volatile or nonvolatile data memories, wherein for example an electronic table and in particular at least one look-up table may be comprised.

The detector described can advantageously be developed in various ways. Thus, the detector can furthermore have at least one modulation device for modulating the illumination, in particular for periodic modulation, in particular a periodic beam interrupting device. A modulation of the illumination should be understood to mean a process in which a total power of the illumination is varied, preferably periodically, in particular with one or a plurality of modulation frequencies. In particular, a periodic modulation can be effected between a maximum value and a minimum value of the total power of the illumination. The minimum value can be 0, but can also be >0, such that, by way of example, complete modulation does not have to be effected. By way of example, the detector can be designed to bring about a modulation of the illumination of the object and/or at least one sensor region of the detector, such as at least one sensor region of the at least one optical sensor, with a frequency of 0.05 Hz to 1 MHz, such as 0.1 Hz to 10 kHz. As outlined above, for this purpose, the detector may comprise at least one modulation device, which may be integrated into the at least one optional illumination source and/or may be independent from the illumination source. Thus, at least one illumination source might, by itself, be adapted to generate the above-mentioned modulation of the illumination, and/or at least one independent modulation device may be present, such as at least one chopper and/or at least one device having a modulated transmissibility, such as at least one electro-optical device and/or at least one acousto-optical device.

The modulation can be effected for example in a beam path between the object and the optical sensor, for example by the at least one modulation device being arranged in said beam path. Alternatively or additionally, however, the modulation can also be effected in a beam path between an optional illumination source—described in even greater detail below—for illuminating the object and the object, for example by the at least one modulation device being arranged in said beam path. A combination of these possibilities is also conceivable. The at least one modulation device can comprise for example a beam chopper or some other type of periodic beam interrupting device, for example comprising at least one interrupter blade or interrupter wheel, which preferably rotates at constant speed and which can thus periodically interrupt the illumination. Alternatively or additionally, however, it is also possible to use one or a plurality of different types of modulation devices, for example modulation devices based on an electro-optical effect and/or an acousto-optical effect. Once again alternatively or additionally, the at least one optional illumination source itself can also be designed to generate a modulated illumination, for example by said illumination source itself having a modulated intensity and/or total power, for example a periodically modulated total power, and/or by said illumination source being embodied as a pulsed illumination source, for example as a pulsed laser. Thus, by way of example, the at least one modulation device can also be wholly or partly integrated into the illumination source. Various possibilities are conceivable.

As outlined above, the detector may comprise at least one illumination source. The illumination source can be embodied in various ways. Thus, the illumination source can be for example part of the detector in a detector housing. Alternatively or additionally, however, the at least one illumination source can also be arranged outside a detector housing, for example as a separate light source. The illumination source can be arranged separately from the object and illuminate the object from a distance. Alternatively or additionally, the illumination source can also be connected to the object or even be part of the object, such that, by way of example, the electromagnetic radiation emerging from the object can also be generated directly by the illumination source. By way of example, at least one illumination source can be arranged on and/or in the object and directly generate the electromagnetic radiation by means of which the sensor region is illuminated. By way of example, at least one infrared emitter and/or at least one emitter for visible light and/or at least one emitter for ultraviolet light can be arranged on the object. By way of example, at least one light emitting diode and/or at least one laser diode can be arranged on and/or in the object. The illumination source can comprise in particular one or a plurality of the following illumination sources: a laser, in particular a laser diode, although in principle, alternatively or additionally, other types of lasers can also be used; a light emitting diode; an incandescent lamp; an organic light source, in particular an organic light emitting diode. Alternatively or additionally, other illumination sources can also be used. It is particularly preferred if the illumination source is designed to generate one or more light beams having a Gaussian beam profile, as is at least approximately the case for example in many lasers. However, other embodiments are also possible, in principle.

Further possible embodiments of the detector relate to the embodiment of the at least one optional transfer device. As explained above, said at least one transfer device can have imaging properties or else can be embodied as a pure non-imaging transfer device, which has no influence on a focusing of the illumination. It is particularly preferred, however, if the transfer device has at least one imaging element, for example at least one lens and/or at least one curved mirror, since, in the case of such imaging elements, for example, a geometry of the illumination on the sensor region can be dependent on a relative positioning, for example a distance, between the transfer device and the object. Generally, it is particularly preferred if the transfer device is designed in such a way that the electromagnetic radiation which emerges from the object is transferred completely to the sensor region, for example is focused completely onto the sensor region, in particular the sensor area, in particular if the object is arranged in a visual range of the detector.

Tunable optical elements, such as focus-tunable lenses, may provide an additional advantage by being capable for correcting the fact that objects at different distances exhibit different focal points. As an example, focus-tunable lenses or focus-tunable lens arrays are disclosed in US 2014/0132724 A1. Further, for potential examples of focus-tunable liquid micro-lens arrays, reference may be made to C. U. Murade et al., Optics Express, Vol. 20, No. 16, 18180-18187 (2012). Again, other embodiments are feasible. In particular, the transfer element in the present sensor may comprise micro-prisms arrays, preferably an electro-wetting device, in particular arrayed electro-wetting micro-prisms. As used herein, the "electro-wetting device" refers to an electro-optical device which may comprise one or more optical elements having at least two different liquids, wherein the focus of each optical element may be adjusted by applying an electrical voltage to the respective optical element. For further details, reference may be made to J. Heikenfeld et al., Optics & Photonics News, January 2009, 20-26. Again, other embodiments of focus-tunable optical elements may be used.

The detector has, as described above, at least one evaluation device. In particular, the at least one evaluation device can also be designed to completely or partly control or drive the detector, for example by the evaluation device being designed to control one or a plurality of modulation devices of the detector and/or to control at least one focus-tunable transfer device of the detector and/or to control at least one illumination source of the detector. Thus, the evaluation device can be designed, in particular, to carry out at least one measurement cycle in which one or a plurality of sensor signals are picked up, for example a plurality of sensor signals at successively different modulation frequencies of the illumination and/or at successively different foci achieved by the at least one focus-tunable transfer device.

The evaluation device is designed, as described above, to generate at least one item of information on a transversal position as well as at least one item of information on a longitudinal position of the object by evaluating the sensor signal. Said position of the object can be static or may even comprise at least one movement of the object, for example a relative movement between the detector or parts thereof and the object or parts thereof. In this case, a relative movement can generally comprise at least one linear movement and/or at least one rotational movement. Items of movement information can for example also be obtained by comparison of at least two items of information picked up at different times, such that for example at least one item of location information can also comprise at least one item of velocity information and/or at least one item of acceleration information, for example at least one item of information about at least one relative velocity between the object or parts thereof and the detector or parts thereof. In particular, the at least one item of location information can generally be selected from: an item of information about a distance between the object or parts thereof and the detector or parts thereof, in particular an optical path length; an item of information about a distance or an optical distance between the object or parts thereof and the optional transfer device or parts thereof; an item of information about a positioning of the object or parts thereof relative to the detector or parts thereof; an item of information about an orientation of the object and/or parts thereof relative to the detector or parts thereof; an item of information about a relative movement between the object or parts thereof and the detector or parts thereof; an item of information about a two-dimensional or three-dimensional spatial configuration of the object or of parts thereof, in particular a geometry or form of the object. Generally, the at least one item of location information can therefore be selected for example from the group consisting of: an item of information about at least one location of the object or at least one part thereof; information about at least one orientation of the object or a part thereof; an item of information about a geometry or form of the object or of a part thereof, an item of information about a velocity of the object or of a part thereof, an item of information about an acceleration of the object or of a part thereof, an item of information about a presence or absence of the object or of a part thereof in a visual range of the detector. The at least one item of location information can be specified for example in at least one coordinate system, for example a coordinate system in which the detector or parts thereof rest. Alternatively or additionally, the location information can also simply comprise for example a distance between the detector or parts thereof and the object or parts thereof. Combinations of the possibilities mentioned are also conceivable.

The above-described detector, the method, the human-machine interface and the entertainment device and also the proposed uses have considerable advantages over the prior art. Thus, generally, a simple and, still, efficient detector for determining a position of at least one object in space may be provided. Therein, as an example, three-dimensional coordinates of an object or part of an object may be determined in a fast and efficient way. Specifically the optical sensor may be designed in a cost-efficient way, may lead to a compact, cost-efficient and, still, highly precise device, in particular by fully or partially being designed as organic photovoltaic devices, such as by using dye-sensitized solar cells for each of these optical sensors, preferably sDSCs.

As compared to devices known in the art, which of them are based on complex triangulation methods, the detector as proposed provides a high degree of simplicity, specifically with regard to an optical setup of the detector. Thus, in principle, a simple combination of one, two or more sDSCs, preferably in combination with a suited transfer device, specifically a suited lens, and in conjunction with an appropriate evaluation device, is sufficient for high precision position detection. This high degree of simplicity, in combination with the possibility of high precision measurements, is specifically suited for machine control, such as in human-machine interfaces and, more preferably, in gaming, scanning, tracking, and stereoscopic vision. Thus, cost-efficient entertainment devices may be provided which may be used for a large number of gaming, scanning, tracking, stereoscopic vision purposes.

Overall, in the context of the present invention, the following embodiments are regarded as particularly preferred:

Embodiment 1: A detector for optically determining a position of at least one object, comprising:
at least one optical sensor for determining a position of at least one light beam traveling from the object to the detector, wherein the optical sensor has at least a first electrode and a second electrode, wherein at least one photovoltaic material is embedded in between the first electrode and the second electrode, wherein the photovoltaic material is adapted to generate electric charges in response to an illumination of the photovoltaic material with light, wherein the first electrode or the second electrode is a split electrode having at least three partial electrodes, wherein each partial electrode is adapted to generate at least one sensor signal, wherein the sensor signal is dependent on a beam cross-section of the light beam in a sensor region of the optical sensor;
at least one evaluation device, wherein the evaluation device is designed to generate at least one item of information on a transversal position of the object, the transversal position being a position in at least one plane perpendicular an optical axis of the detector, by evaluating the sensor signal of pairs of the partial electrodes, and wherein the evaluation device is designed to generate at least one item of information on a longitudinal position of the object (112) by evaluating a sum of the sensor signals of all partial electrodes.

Embodiment 2: The detector according to the preceding embodiment, wherein the optical sensor comprises at least one dye-sensitized solar cell.

Embodiment 3: The detector according to the preceding embodiment, wherein the dye-sensitized solar cell is a solid dye-sensitized solar cell, comprising a layer setup embedded in between the first electrode and the second electrode, the layer setup comprising at least one n-semiconducting metal oxide, at least one dye, and at least one solid p-semiconducting organic material.

Embodiment 4: The detector according to any one of the preceding embodiments, wherein the optical sensor at least comprises the first electrode, at least one n-semiconducting metal oxide, at least one dye, at least one p-semiconducting organic material, and at least the second electrode.

Embodiment 5: The detector according to any one of the preceding embodiments, wherein the first electrode at least partially is made of at least one transparent conductive oxide, wherein the second electrode at least partially is made of an electrically conductive polymer, preferably a transparent electrically conductive polymer.

Embodiment 6: The detector according to the preceding embodiment, wherein the conductive polymer is selected from the group consisting of: a poly-3,4-ethylenedioxythiophene (PEDOT), preferably PEDOT being electrically doped with at least one counter ion, more preferably PEDOT doped with sodium polystyrene sulfonate (PEDOT:PSS); a polyaniline (PANI); a polythiophene.

Embodiment 7: The detector according to any one of the two preceding embodiments, wherein the conductive polymer provides an electric resistivity of 0.1-20 kΩ between the partial electrodes, preferably an electric resistivity of 0.5-5.0 kΩ and, more preferably, an electric resistivity of 1.0-3.0 kΩ.

Embodiment 8: The detector according to any one of the preceding embodiments, wherein the first electrode is the split electrode, wherein the n-semiconducting metal oxide, the dye, the p-semiconducting organic material, and the second electrode is transparent.

Embodiment 9: The detector according to the preceding embodiment, wherein the split electrode has two pairs of two partial electrodes, wherein two sides of each partial electrode adjoin one side of a further partial electrode.

Embodiment 10: The detector according to any one of the preceding embodiments, wherein no gap remains between two adjacent partial electrodes.

Embodiment 11: The detector according to the preceding embodiment, wherein the two adjacent partial electrodes partially overlap each other, wherein an overlap area is created, wherein the overlap area is 1% or less than an area of each of the overlapping partial electrode.

Embodiment 12: The detector according to any one of the preceding embodiments, wherein electrical currents through the partial electrodes are dependent on a position of the light beam in the sensor region.

Embodiment 13: The detector according to the preceding embodiment, wherein the optical sensor is adapted to generate the transversal sensor signal in accordance with the electrical currents through the partial electrodes.

Embodiment 14: The detector according to any one of the two preceding embodiments, wherein the detector, preferably the optical sensor and/or the evaluation device, is adapted to derive the information on the transversal position of the object from at least one ratio of the currents through the partial electrodes.

Embodiment 15: The detector according to any one of the preceding embodiments, wherein the evaluation device is designed to generate the item of information on the transversal position of the object, first, by forming sums of the sensor signals of pairs of adjacent partial electrodes located perpendicular to a selected direction within the plane, second, by forming at least one difference between the sums of the sensor signals of the pairs of the adjacent partial electrodes within the selected direction, and, third, by dividing the difference by the sum of the sensor signals of all partial electrodes.

Embodiment 16: The detector according to any one of the preceding embodiments, wherein at least four partial electrodes are provided.

Embodiment 17: The detector according to any one of the preceding embodiments, wherein the optical sensor exhibits a shape selected from the group comprising a planar, a planar-convex, a planar-concave, a biconvex, or a biconcave form.

Embodiment 18: The detector according to any one of the preceding embodiments, wherein the detector further comprises at least one transfer device.

Embodiment 19: The detector according to the preceding embodiment, wherein the transfer device comprises at least one focus-tunable transfer device.

Embodiment 20: The detector according to the preceding embodiment, wherein the focus-tunable transfer device comprises a focus-tunable lens or an electro-wetting device.

Embodiment 21: The detector according to any one of the preceding embodiments, wherein the detector further comprises at least one imaging device.

Embodiment 22: The detector according to the preceding embodiment, wherein the imaging device comprises a camera.

Embodiment 23: The detector according to any one of the two preceding embodiments, wherein the imaging device comprises at least one of: an inorganic camera; a monochrome camera; a multichrome camera; a full-color camera; a pixelated inorganic chip; a pixelated organic camera; a CCD chip, preferably a multi-color CCD chip or a full-color CCD chip; a CMOS chip; an IR camera; an RGB camera.

Embodiment 24: The detector according to any one of the preceding embodiments, wherein the detector furthermore has at least one modulation device for modulating the illumination.

Embodiment 25: The detector according to the preceding embodiment, wherein the detector is designed to detect at least two sensor signals in the case of different modulations, in particular at least two sensor signals at respectively different modulation frequencies, wherein the evaluation device is designed to generate the at least one item of information on the longitudinal position of the object by evaluating the at least two sensor signals.

Embodiment 26: The detector according to any one of the preceding embodiments, wherein the detector is designed to detect at least two sensor signals.

Embodiment 27: The detector according to the preceding embodiment, wherein the detector comprises at least two separate optical sensors.

Embodiment 28: The detector according to the preceding embodiment, wherein the at least two separate optical sensors are located in a manner that an impinging light beam consecutively impinges the at least two separate optical sensors.

Embodiment 29: The detector according to any one of the two preceding embodiments, wherein one of the at least two optical sensors is transparent for a first part of the optical spectrum and absorbing for the other parts of the optical spectrum.

Embodiment 30: The detector according to the preceding embodiment, wherein a further of the at least two optical sensors is transparent for a second part of the optical spectrum and absorbing for the other parts of the optical spectrum, wherein the first part of the optical spectrum and the second part of the optical spectrum are separate from each other.

Embodiment 31: The detector according to any one of the five preceding embodiments, wherein the evaluation device is designed to generate at least two items of information on the longitudinal position of the object by evaluating the at least two sensor signals.

Embodiment 32: The detector according to any one of the preceding embodiments, wherein the detector comprises at least two optical sensors being located in a collimated arrangement in a manner that they are aligned in an orientation parallel to the optical axis of the detector and exhibit an individual displacement in the orientation perpendicular to the optical axis of the detector.

Embodiment 33: The detector according to the preceding embodiment, wherein at least two of the optical sensors are longitudinal optical sensors, wherein the sensor signals of the longitudinal optical sensors are combined for determining the item of information on the longitudinal position of the object.

Embodiment 34: The detector according to any one of the two preceding embodiments, wherein at least one of the optical sensors is a transversal optical sensor, wherein the sensor signals of the transversal optical sensor are used for determining the item of information on the transversal position of the object.

Embodiment 35: The detector according to the preceding embodiment, wherein a stereoscopic view of the object is obtained by combining the item of information on the longitudinal position of the object and the item of information on the transversal position of the object.

Embodiment 36: The detector according to any one of the preceding embodiments, wherein the optical sensor is furthermore designed in such a way that the sensor signal, given the same total power of the illumination, is dependent on a modulation frequency of a modulation of the illumination.

Embodiment 37: The detector according to the preceding embodiment, wherein the item of information on the transversal position of the object is separated from the item of information on the longitudinal position of the object by evaluating a frequency dependency of the sensor signals.

Embodiment 38: The detector according to any one of the preceding embodiments, wherein the evaluation device is designed to generate the at least one item of information on the longitudinal position of the object from at least one predefined relationship between the geometry of the illumination and a relative positioning of the object with respect to the detector, preferably taking account of a known power of the illumination and optionally taking account of a modulation frequency with which the illumination is modulated.

Embodiment 39: The detector according to any one of the preceding embodiments, furthermore comprising at least one illumination source.

Embodiment 40: The detector according to the preceding embodiment, wherein the illumination source is selected from: an illumination source, which is at least partly connected to the object and/or is at least partly identical to the object; an illumination source which is designed to at least partly illuminate the object with a primary radiation, wherein the light beam preferably is generated by a reflection of the primary radiation on the object and/or by light emission by the object itself, stimulated by the primary radiation.

Embodiment 41: The detector according to the preceding embodiment, wherein the evaluation device is adapted to compare the diameter of the light beam with known beam properties of the light beam in order to determine the at least one item of information on the longitudinal position of the object, preferably from a known dependency of a beam diameter of the light beam on at least one propagation coordinate in a direction of propagation of the light beam and/or from a known Gaussian profile of the light beam.

Embodiment 42: The detector according to any one of the two preceding embodiments, wherein the illumination source is a structured light source.

Embodiment 43: An arrangement comprising at least two detectors according to any one of the preceding embodiments.

Embodiment 44: The arrangement according to the preceding embodiment, wherein the arrangement further comprises at least one illumination source.

Embodiment 45: A human-machine interface for exchanging at least one item of information between a user and a machine, in particular for inputting control commands, wherein the human-machine interface comprises at least one detector according to any one of the preceding embodiments relating to a detector, wherein the human-machine interface is designed to generate at least one item of geometrical information of the user by means of the detector wherein the human-machine interface is designed to assign to the geometrical information at least one item of information, in particular at least one control command.

Embodiment 46: The human-machine interface according to the preceding embodiment, wherein the at least one item of geometrical information of the user is selected from the group consisting of: a position of a body of the user; a position of at least one body part of the user; an orientation of a body of the user; an orientation of at least one body part of the user.

Embodiment 47: An entertainment device for carrying out at least one entertainment function, in particular a game, wherein the entertainment device comprises at least one human-machine interface according to any one of the preceding embodiments referring to a human-machine interface, wherein the entertainment device is designed to enable at least one item of information to be input by a player by means of the human-machine interface, wherein the entertainment device is designed to vary the entertainment function in accordance with the information.

Embodiment 48: A tracking system for tracking the position of at least one movable object, the tracking system comprising at least one detector according to any one of the preceding embodiments referring to a detector, the tracking system further comprising at least one track controller, wherein the track controller is adapted to track a series of positions of the object, each position comprising at least one item of information on a transversal position of the object at a specific point in time and at least one item of information on a longitudinal position of the object at a specific point in time.

Embodiment 49: The tracking system according to any one of the preceding embodiments referring to a tracking system, wherein the track controller is adapted to initiate at least one action in accordance with an actual position of the object.

Embodiment 50: The tracking system according to the preceding embodiment, wherein the action is selected from the group consisting of: a prediction of a future position of the object; pointing at least one device towards the object; pointing at least one device towards the detector; illuminating the object; illuminating the detector.

Embodiment 51: A scanning system for determining at least one position of at least one object, the scanning system comprising at least one detector according to any one of the preceding embodiments relating to a detector, the scanning system further comprising at least one illumination source adapted to emit at least one light beam configured for an illumination of at least one dot located at at least one surface of the at least one object, wherein the scanning system is designed to generate at least one item of information about the distance between the at least one dot and the scanning system by using the at least one detector.

Embodiment 52: The scanning system according to the preceding embodiment, wherein the illumination source comprises at least one artificial illumination source, in particular at least one laser source and/or at least one incandescent lamp and/or at least one semiconductor light source.

Embodiment 53: The scanning system according to any one of the two preceding embodiments, wherein the illumination source emits a plurality of individual light beams, in particular an array of light beams exhibiting a respective pitch, in particular a regular pitch.

Embodiment 54: The scanning system according to any one of the three preceding embodiments, wherein the scanning system comprises at least one housing.

Embodiment 55: The scanning system according to the preceding embodiment, wherein the at least one item of information about the distance between the at least one dot and the scanning system distance is determined between the at least one dot and a specific point on the housing of the scanning system, in particular a front edge or a back edge of the housing.

Embodiment 56: The scanning system according to any one of the two preceding embodiments, wherein the housing comprises at least one of a display, a button, a fastening unit, a leveling unit.

Embodiment 57: A stereoscopic system comprising at least one tracking system according to any one of the embodiments which refer to the tracking system and at least one scanning system according to any one of the embodiments which refer to the scanning system, wherein the tracking system and the scanning system each comprise at least one optical sensor which are placed in a collimated arrangement in such a manner that they are aligned in an orientation parallel to the optical axis of the stereoscopic system and, concurrently, exhibit an individual displacement with respect to the orientation perpendicular to the optical axis of the stereoscopic system.

Embodiment 58: The stereoscopic system according to the preceding embodiment, wherein the tracking system and the scanning system each comprise at least one longitudinal optical sensor, wherein the sensor signals of the longitudinal optical sensors are combined for determining the item of information on the longitudinal position of the object.

Embodiment 59: The stereoscopic system according to the preceding embodiment, wherein the sensor signals of the longitudinal optical sensors are distinguishable with respect to each other by applying a different modulation frequency.

Embodiment 60: The stereoscopic system according to the preceding embodiment, wherein the stereoscopic system further comprises at least one transversal optical sensor, wherein the sensor signals of the transversal optical sensor are used for determining the item of information on the transversal position of the object.

Embodiment 61: The stereoscopic system according to the preceding embodiment, wherein a stereoscopic view of the object is obtained by combining the item of information on the longitudinal position of the object and the item of information on the transversal position of the object.

Embodiment 62: A camera for imaging at least one object, the camera comprising at least one detector according to any one of the preceding embodiments referring to a detector.

Embodiment 63: A method for determining a position of at least one object, in particular using a detector according to any one of the preceding embodiments relating to a detector,
  wherein at least one optical sensor of a detector is used, wherein the optical sensor determines a position of at least one light beam traveling from the object to the detector, wherein the optical sensor has at least a first electrode and a second electrode, wherein at least one photovoltaic material is embedded in between the first electrode and the second electrode, wherein the photovoltaic material is adapted to generate electric charges in response to an illumination of the photovoltaic material with light, wherein the first electrode or the second electrode is a split electrode having at least three partial electrodes, wherein each partial electrode is adapted to generate at least one sensor signal, wherein the sensor signal is dependent on a beam cross-section of the light beam in a sensor region of the optical sensor;
  wherein at least one evaluation device is used, wherein the evaluation device generates at least one item of information on a transversal position of the object, the transversal position being a position in at least one plane perpendicular an optical axis of the detector, by evaluating the sensor signal of pairs of the partial electrodes, and wherein the evaluation device further generates at least one item of information on a longitudinal position of the object by evaluating a sum of the sensor signals of all partial electrodes.

Embodiment 64: The use of a detector according to any one of the preceding embodiments relating to a detector, for a purpose of use, selected from the group consisting of: a distance measurement, in particular in traffic technology; a position measurement, in particular in traffic technology; a tracking application, in particular in traffic technology; an entertainment application; a camera, in particular in a security application; a human-machine interface application; a mapping application, in particular for generating maps of at least one space; in automated machine processes, selected from the group consisting of: a distance measurement; a position measurement; a tracking application; a scanning application; in stereoscopic vision; in high-precision metrology, in particular in analytics; in modeling of manufacturing parts; in medical operations, in particular in endoscopic methods.

BRIEF DESCRIPTION OF THE FIGURES

Further optional details and features of the invention are evident from the description of preferred exemplary embodiments which follows in conjunction with the dependent claims. In this context, the particular features may be implemented alone or with several other features in combination. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

EXEMPLARY EMBODIMENTS

Figure 1:
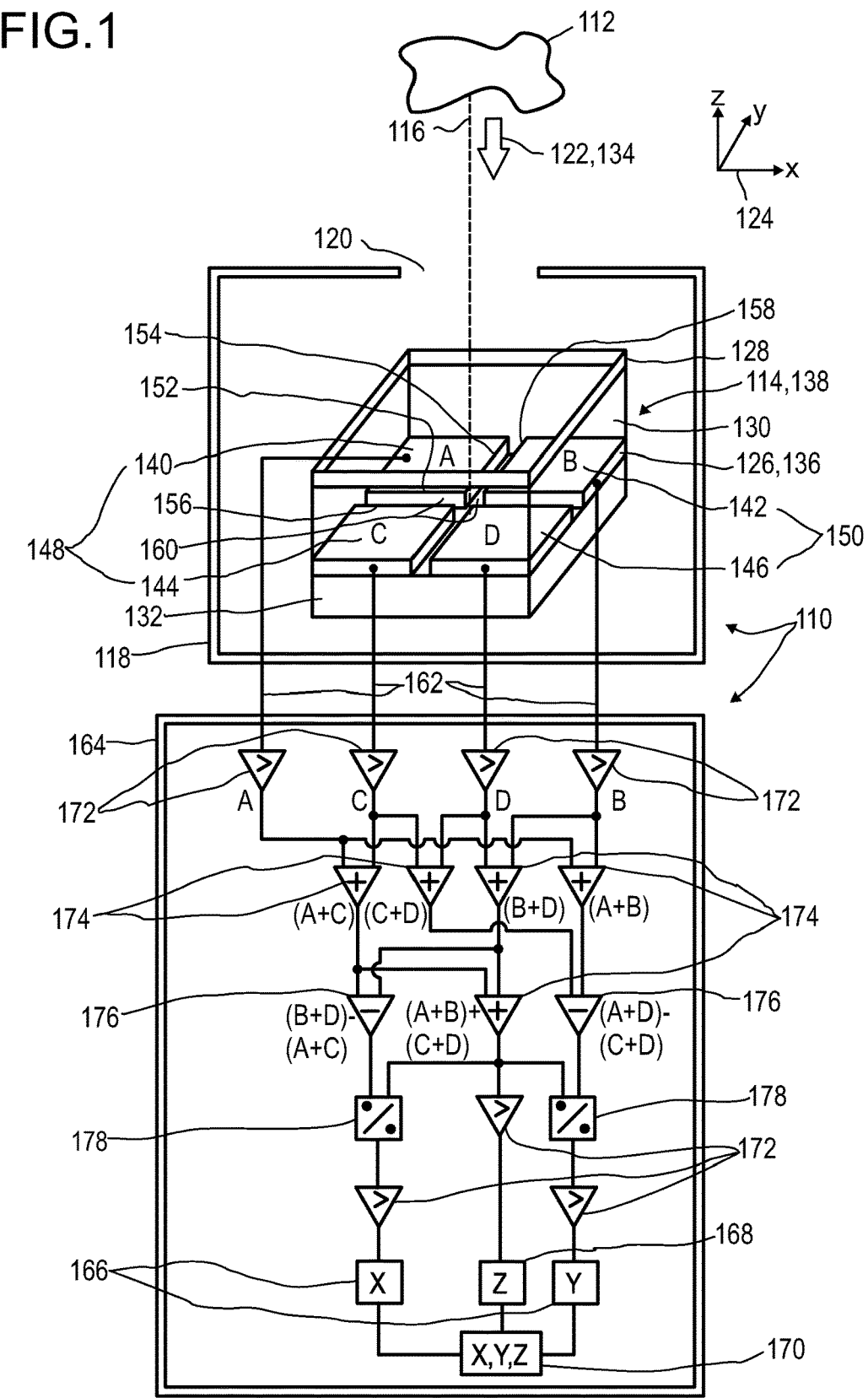
FIG. 1 shows an exemplary embodiment of a detector according to the present invention.

FIG. 1 illustrates, in a highly schematic illustration, an exemplary embodiment of a detector 110 according to the invention, for determining a position of at least one object 112. The detector 110 comprises an optical sensor 114, which, in this specific embodiment, is arranged along an optical axis 116 of the detector 110. Specifically, the optical axis 116 may be an axis of symmetry and/or rotation of the setup of the optical sensor 114. The optical sensor 114 may preferably be located inside a housing 118 of the detector 110. An opening 120 in the housing 118, which, preferably, is located concentrically with regard to the optical axis 116, preferably defines a direction of view 122 of the detector 110. A coordinate system 124 may be defined, in which a direction parallel or antiparallel to the optical axis 116 is defined as a longitudinal direction, whereas directions perpendicular to the optical axis 116 may be defined as transversal directions. In the coordinate system 124, as symbolically depicted in FIG. 1, the longitudinal direction is denoted by the coordinate "z" whereas the transversal directions are denoted by the respective coordinates "x" and "y". However, other types of coordinate systems 124 may also be feasible.

The optical sensor 114 comprises a first electrode 126 and a second electrode 128, wherein a photovoltaic material 130 is embedded ("sandwiched") between the first electrode 126 and the second electrode 128, wherein the first electrode 126 may be located on a separate substrate 132. Herein, the photovoltaic material 130 is adapted to generate electric charges in response to an illumination of the photovoltaic material 130 by means of at least one incident light beam 134, wherein the light comprised within the light beam 134 may originate from the object 112 or may be light being reflected by the object 112 towards the opening 120 in the housing 118 and may, thus, impinge the optical sensor 114. In this example, the light comprised within the light beam 134 may first meet the second electrode 128 until, after having traversed the photovoltaic material 130, it may impinge the first electrode 126, wherein such a transition of the light may be able to generate electric charges within the photovoltaic material 130 in a manner that the electric charges might result in an electrical current through the electrodes 126, 128 depending on the location of the generation of the electric charges and, thus, on the position of the light beam 134 in a sensor region 138 of the optical sensor 114.

According to the exemplary embodiment of the detector 110 as schematically depicted in FIG. 1, the first electrode 126 of the optical sensor 114 is a split electrode 136, wherein, in this particularly preferred example, the split electrode 136 comprises four partial electrodes 140, 142, 144, 146, wherein each of the partial electrodes 140, 142, 144, 146 is adapted to generate at least one sensor signal. Herein, the optical sensor 114 comprises a sensor region 138, which, preferably, is transparent for the light beam 134 travelling from the object 112 to the detector 110. The optical sensor 114 is adapted to determine the transversal position of the light beam 134 in one or more transversal directions, such as in direction x and/or in direction y. Therein, embodiments are feasible in which the transversal position in only one transversal direction is determined, or further embodiments, in which the transversal positions in more than one transversal directions are determined by one and the same optical sensor 114. For this purpose, the optical sensor 114 is designed to generate at least one sensor signal in a manner dependent on an illumination of the respective sensor region 138 by the light beam 134. The longitudinal sensor signal, given the same total power of the illumination, is dependent on a beam cross-section of the light beam 134 in the respective sensor region 138.

Whereas in this exemplary embodiment of the detector 110 as schematically shown in FIG. 1, the first electrode 126 is the split electrode 136, it may, in a further embodiment, which is not depicted here, also be possible that the second electrode 128 may be the split electrode 136. While in the embodiment as shown in FIG. 1 the second electrode 128 preferably exhibits a high transparency in order to achieve a high intensity of the light beam 134 at the location where it may impinge the first electrode 126, in the other case where the second electrode 128 may be the split electrode 136, the first electrode 126 may also be transparent but even be intransparent, in particular when the first electrode 126 is the last electrode being impinged by the light beam 134 within the optical sensor 114.

Further, in this particularly preferred example as depicted in FIG. 1, the split electrode 136 actually comprises four partial electrodes 140, 142, 144, 146, which each is capable of providing a sensor signal, such as a current or a voltage, further schematically being denoted as A, B, C, D. Herein, the split electrode 136 comprises two pairs 148, 150 of partial electrodes, wherein each pair 148, 150 itself comprises two separate partial electrodes, thus summing up to the mentioned four partial electrodes 140, 142, 144, 146. Further in this example, each of the four partial electrodes 140, 142, 144, 146 may exhibit a surface in a square shape, wherein the four partial electrodes 140, 142, 144, 146 may be arranged in a manner that two sides 152, 154 of each partial electrode, e.g. the partial electrode 140, may adjoin one side 156, 158, of a further partial electrode, e.g. the partial electrodes 142 or 144, respectively. The arrangement may, preferably, be presented in a manner that the surface of the four partial electrodes 140, 142, 144, 146 may altogether occupy a rectangular area, such as a square area, on the optical sensor 114.

It shall, however, be noted that, according to the present invention, further embodiments which may exhibit a different number, a different shape and/or a different arrangement of the partial electrodes may also be feasible. As an example, six partial electrodes which might comprise three pairs of two partial electrodes each, or nine partial electrodes which might comprise three pairs of three partial electrodes each, may still be arranged in order to occupy a rectangular area on the optical sensor 114. As a further example, six partial electrodes wherein each partial electrode might exhibit a form of a triangle may be provided in a manner that the surface of the six partial electrodes may altogether occupy a hexagonal area on the optical sensor 114.

Furthermore, it may be particularly advantageous to arrange the partial electrodes 140, 142, 144, 146 in a manner that the surface created by their specific arrangement may cover a specific area which exhibits as least as possible dead space between the adjoining partial electrodes, in particular, to achieve an electrical current from the respective partial electrodes as large as possible. For this purpose, two adjacent partial electrodes, such as the partial electrodes 140, 142 or the partial electrodes 140, 144, may be arranged in the optical sensor 114 in a manner that no or only a small gap 160 may remain between them. Alternatively but not depicted here, the two adjacent partial electrodes, such as the partial electrodes 140, 142 or the partial electrodes 140, 144, may, further, partially overlap in a manner that an overlap area may be created which might, however, only cover 1% or less of an area of each of the mentioned overlapping partial electrodes.

Thus, the at least one optical sensor 114 is adapted to generate at least one sensor signal, wherein the generated sensor signals A, B, C, D may be transmitted by one or more signal leads 162 to at least one evaluation device 164 of the detector 110. Herein, the evaluation device 164 is designated to generate the at least one item of information on the transversal position of the object 112 in at least one transversal evaluation unit 166 (denoted by "x" or by "y"), wherein the transversal position is the position in the at least one plane perpendicular an optical axis 116 of the detector 110, by evaluating the sensor signals A, B, C, D of the pairs of the partial electrodes 140, 142, 144, 146. Further, the evaluation device 164 is designated to generate the at least one item of information on the longitudinal position of the object 112 in the at least one longitudinal evaluation unit 168 (denoted by "z"), wherein the longitudinal position is the position parallel to the optical axis 116 of the detector 110, by evaluating a sum of the sensor signals A, B, C, D of all partial electrodes 140, 142, 144, 146. By combining results which may be derived by the evaluation units 166, 168, a position information 170, preferably a three-dimensional position information, may, thus, be generated (denoted by "x, y, z").

Herein, the evaluation device 164 may be part of a data processing device and/or may comprise one or more data processing devices. The evaluation device 164 may be embodied as a separate device, as shown in FIG. 1, which might be electrically connected in a wireless or wire-bound fashion to the optical sensor 114, in particular by the signal leads 162, but may, alternatively (not depicted in FIG. 1), be fully or partially integrated into the housing 118. The evaluation device 164 may further comprise one or more additional components, such as one or more electronic hardware components and/or one or more software components, such as one or more measurement units (not depicted in FIG. 1). Also, the discrete electronic elements as shown in FIG. 1 might, alternatively, be implemented by means of the further electronic hardware components and/or software components.

As further schematically illustrated in FIG. 1, the evaluation device 164 may receive the sensor signals A, B, C, D as provided by the four partial electrodes 140, 142, 144, 146 of the split electrode 136 in this exemplary embodiment by means of the four separate signal leads 162, each of the signal leads 162 providing the electrical connection between a particular partial electrode 140, 142, 144, 146 and the evaluation device 164. Preferably, the sensor signals A, B, C, D may first be amplified in corresponding preamplifiers 172 after being received by the evaluation device 164 in order to enhance their amplitude. In this particular example, the sensor signals A, B, C, D as provided by the four separate signal leads 162, whether preamplified or not, are used to perform a number of summations within corresponding adders 174, wherein, preferably, the following respective sums of the sensor signals as provided by adjacent partial electrodes may be obtained:

(A+C); (C+D); (B+D); and (A+B).

Thereafter, the following respective differences between sums of the sensor signals as provided by adjacent partial electrodes may be obtained by using corresponding subtractors 176:

(B+D)−(A+C); (A+B)−(C+D).

In parallel, a further adder 174 may be used to provide the following total sum of all sensor signals as provided by adjacent partial electrodes 140, 142, 144, 146:

(A+B)+(C+D)=(A+B+C+D).

According to the preferred embodiment as shown in FIG. 1, the total sum (A+B+C+D) might be used for two different kinds of purposes. First, the total sum (A+B+C+D) may be employed to normalize the above mentioned differences by means of at least one divider 178 between the sums of the sensor signals as provided by adjacent partial electrodes:

$$\frac{(B+D)-(A+C)}{(A+B+C+D)}; \frac{(A+B)-(C+D)}{(A+B+C+D)}.$$

Thus, the first term may provide information with regard to the x-position of the impinging light beam 134, while the second term may provide information with regard to the y-position of the impinging light beam 134. The signals according to both terms may, preferably, further be amplified in the additional preamplifiers 172 until they are provided as the at least one item of information on the transversal position of the object 112 to the at least one transversal evaluation unit 166 (denoted here by "x" or "y", respectively). Thus, the optical sensor 114 may be employed for providing the item of information on the transversal position of the object 112 and may therefore also be denoted as "transversal optical sensor".

Second, the total sum (A+B+C+D) may be employed for providing the at least one item of information on the longitudinal position of the object 112 and may therefore be supplied to the least one longitudinal evaluation unit 168 (denoted here by "z"), wherein the at least one item of information on the longitudinal position of the object 112 might be derived, such as by taking into account any ambiguity with respect to this value. As a result, the optical sensor 114 may also be employed for providing the item of information on the longitudinal position of the object 112 and may therefore also be denominated as "longitudinal optical sensor".

Finally, the complete position information 170, which may, preferably, constitute the three-dimensional position information (denoted by "x, y, z"), may, thus, be generated by the evaluation device 164 of the detector 110. Consequently, the optical sensor 114 may be employed for providing both the item of information on the longitudinal position of the object 112 and the item of information on the transversal position of the object 112 may, within this regard, also be referred to as "combined longitudinal and transversal optical sensor".

Figure 2:
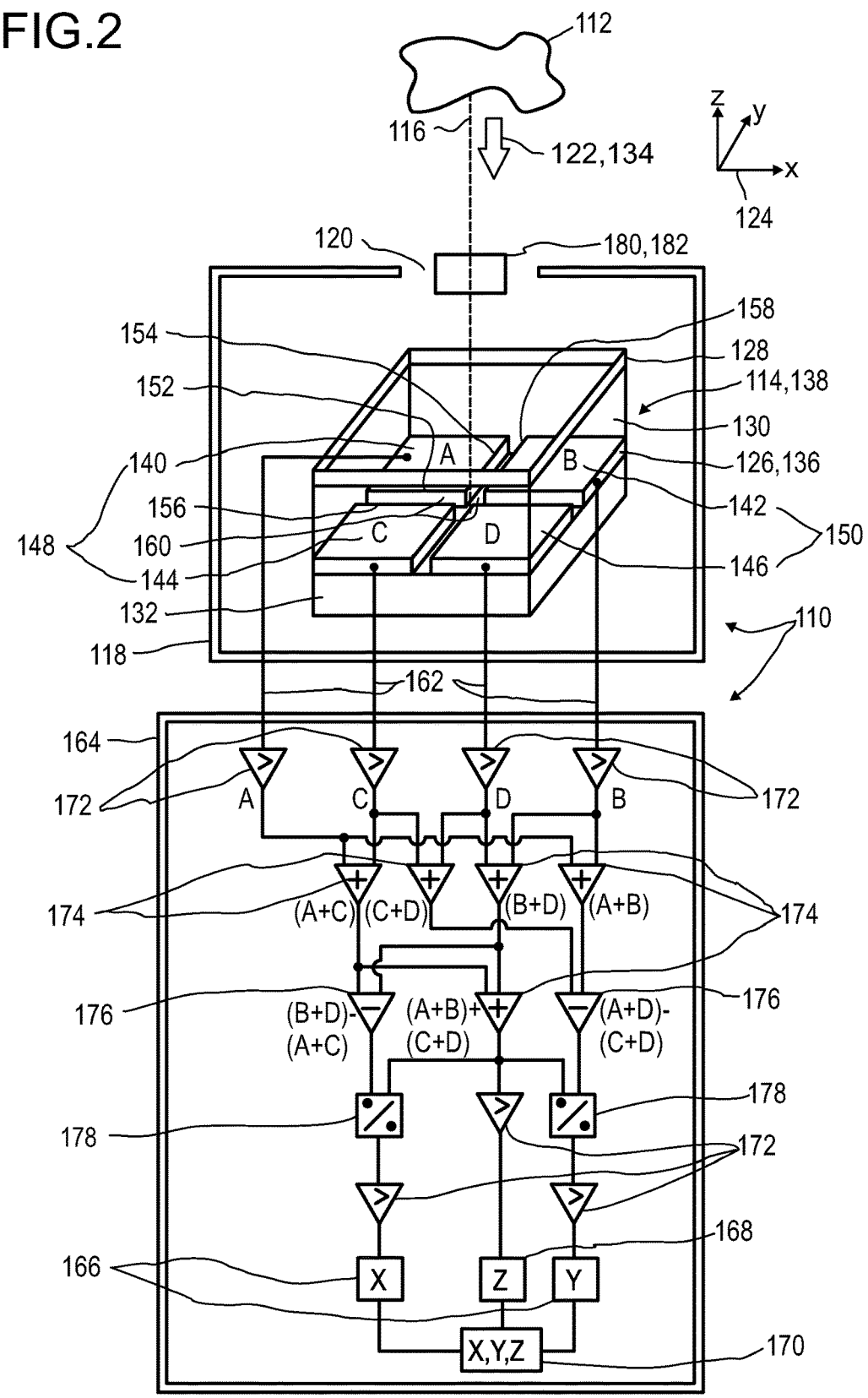
FIG. 2 shows a further embodiment of a detector according to the present invention, which additionally comprises a transfer device, in particular an electro-wetting device.

FIG. 2 illustrates, in a schematic illustration, a further exemplary embodiment of the detector 110 according to the present invention, for determining a position of the at least one object 112. This particular embodiment may additionally comprise at least one transfer device 180, such as one or more optical systems, preferably comprising one or more focus-tunable transfer device 180, in particular an electro-wetting device 182, which may, particularly, be placed along the optical axis 116 of the detector 110, such as in the opening 120 or in front of the opening 120. As described above, the electro-wetting device 182 may comprise one or more optical elements having at least two different liquids, wherein the focus of each optical element may be adjusted by applying an electrical voltage to the respective optical element.

For sake of clarity, FIG. 2 does not depict any existing lead which may provide a connection between the transfer device 180, in particular the electro-wetting device 182, and the evaluation device 164. This connection might be employed for being able to positioning the focus within the detector 110 by using the transfer device 180, in particular the electro-wetting device 182, as well as for taking into account the effect of the transfer device 180, in particular the electro-wetting device 182, when determining the longitudinal position of the object 112 by means of the evaluation device 164. Within this regard, the focus-tunable transfer device 180 may be particularly useful by being able to providing a correction for the fact that objects at different distances exhibit different focal points.

Further, the focus-tunable transfer device 180 may, alternatively or in addition, be employed to intentionally vary the focus with respect to the location of the optical sensor 114, thus being able to resolve any ambiguity in the known relationship between a beam cross-section of the light beam and the longitudinal position of the object 112 as, for example, described in WO 2014/097181 A1 in more detail. As known from there, the optical sensor 114 which may be positioned at a specific distance before or behind the focal point 194 may provide the same sensor signals. A similar ambiguity might arise in case the light beam 134 weakens during propagations along the optical axis 116, which might generally be corrected empirically and/or by calculation. In order to resolve this ambiguity in the z-position, a plurality of different sensor signals which may each be recorded with a different location of the focus may allow determining the position of the focal point. Thus, by comparing two or more sensor signals, it may be determined whether the optical sensor 114 may be located before or beyond the focal point located along the longitudinal axis 116.

With respect to the other features as presented in an exemplary fashion in FIG. 2, reference is made to the above description of FIG. 1.

Figure 3:
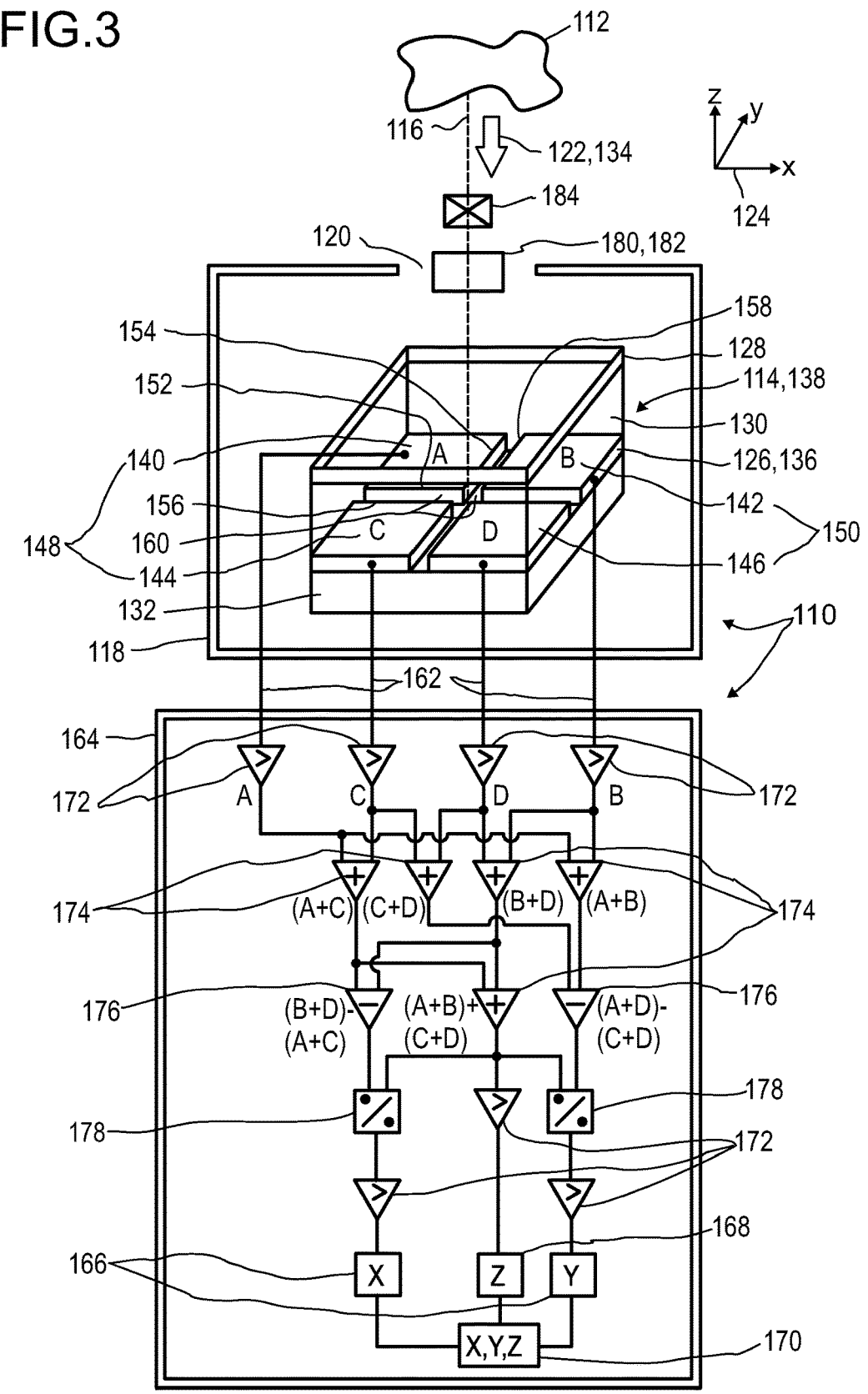
FIG. 3 shows a further embodiment of a detector according to the present invention, which additionally comprises a modulation device in addition to the transfer device as depicted in FIG. 2.

A further exemplary embodiment of the detector 110 according to the present invention is shown in FIG. 3 a highly schematic manner. In this particular embodiment, the detector 110 may comprise at least one modulation device 184 which may, particularly, be placed along the optical axis 116 of the detector 110, preferably between the object 112 and the opening 120. As depicted herein, the modulation device 184 may preferably be located between the transfer device 100, which here comprises one electro-wetting device 182, and the optical sensor 114, which, in this embodiment, comprises the first electrode 126 and the second electrode 128, wherein the photovoltaic material 130 is embedded between the first electrode 126 and the second electrode 128, wherein the first electrode 126 is the split electrode 136 actually comprising four partial electrodes 140, 142, 144, 146.

In this example, sensor signals may be provided for a variety of modulation frequencies of the light beam 134, wherein the modulation frequencies might, preferably, be provided by the modulation device 184. Whereas for a modulation frequency of 0 Hz, no FiP effect or only a very small FiP effect, which may not easily be distinguished from the noise of the longitudinal sensor signal, may be detected. For higher modulation frequencies, however, a decisive FiP effect as described above, i.e. a pronounced dependency of the longitudinal sensor signal on the cross section of the light beam 134, may be observed. Typically, modulation frequencies in the range of 0.1 Hz to 10 kHz may be used for the detector according to the present invention, such as modulation frequencies of 0.3 Hz.

For sake of clarity, also FIG. 3 does not depict any existing leads which may provide the connection, on one hand, between the transfer device 180, in particular the electro-wetting device 182, and the evaluation device 164 and, on the other hand, between the modulation device 184 and the evaluation device 164. The connection between the modulation device 184 and the evaluation device 164 might, within a first regard, be useful for being able to adjust the modulation frequency as provided by the modulation device 184 for modulating the incident light beam 134 prior to entering the housing 118 of the detector 110 and, within a second regard, for taking into account the modulation frequency by the evaluation device 164 when performing a demodulation of the sensor signals received by the evaluation device 164 as required for the further processing of the sensor signals in determining the position of the object 112, in particular with respect to the longitudinal position of the object 112. Herein, the demodulation may, preferably, be performed as a first step, before or after a pre-amplification of the sensor signals, as soon as the sensor signals may have been received by the evaluation device 164. However, other embodiments may be feasible.

With respect to the other features as presented in an exemplary fashion in FIG. 3, reference is made to the above descriptions concerning FIGS. 1 and/or 2.

Figure 4:
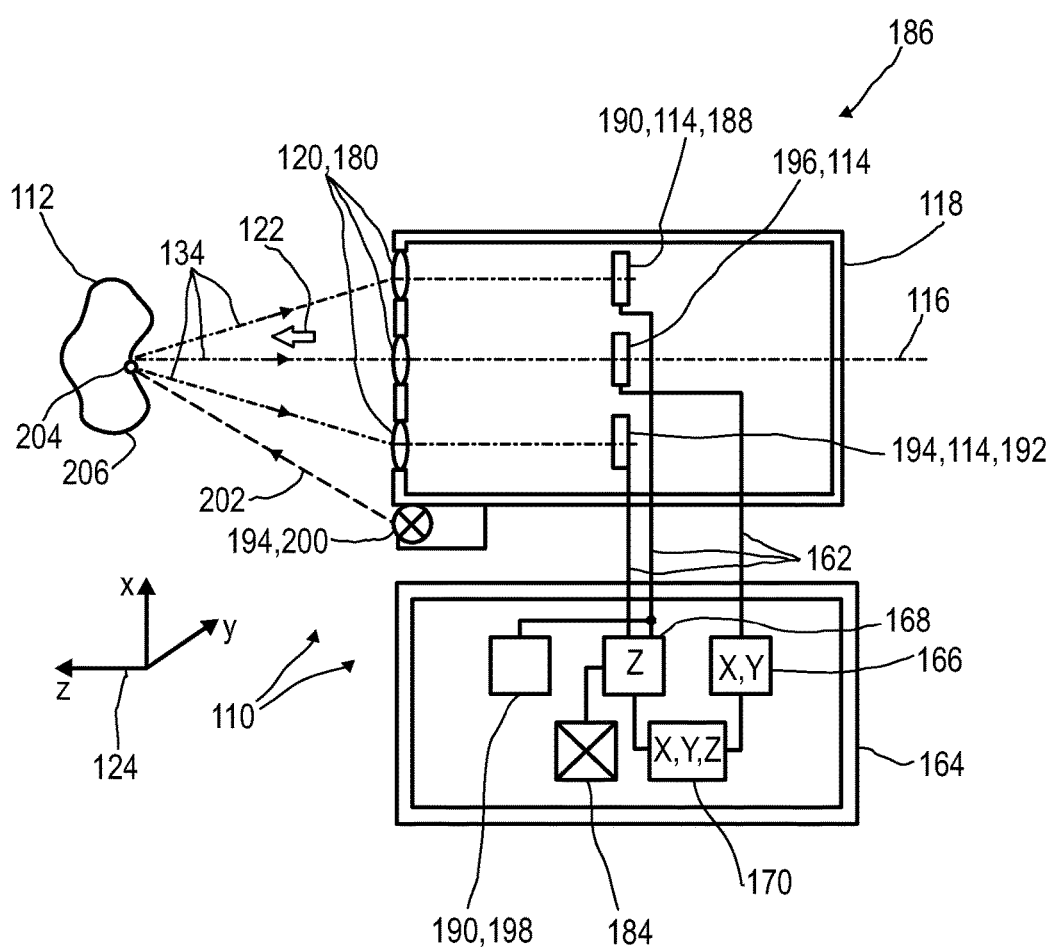
FIG. 4 shows an embodiment of a stereoscopic system according to the present invention.

FIG. 4 schematically illustrates an embodiment for a stereoscopic system 186 for generating at least one single circular, three-dimensional image of the at least one object 112. For this purpose, the stereoscopic system 186 comprises at least two, preferably two or three, of the optical sensors 114, which may be employed for providing the item of information on the longitudinal position of the object 112 as well as on the transversal position of the object 112 in a combined fashion. As shown in FIG. 4, the optical sensors 114 are located inside the housing 118 of the detector 110 of the stereoscopic system 186. Herein, the optical sensors 114 as employed in the stereoscopic system 186 may be one or more of the optical sensors 114 as described in one or more of the FIGS. 1 to 3. Alternatively, one or more of the optical sensors 114 as disclosed in in WO 2012/110924 A1, WO 2014/097181 A1, or international patent application number PCT/IB2015/054536.

In the particular embodiment as depicted in FIG. 4, a first longitudinal optical sensor 188 is comprised as one of the optical sensors 114 in a tracking system 190, in particular in the tracking system 190 according to the present invention. Further, a second longitudinal optical sensor 192 is comprised as a further of the optical sensors 114 in a scanning system 194, in particular in the scanning system 194 according to the present invention. In addition, the stereoscopic system 186 as depicted here, further, comprises a separate position sensitive device 196 which constitutes an additional one of the optical sensors 114 especially being adapted for generating the item of information on the transversal position of the object 112.

As further illustrated here, the optical sensors 114 in the stereoscopic system 186 may, preferably, be arranged in separate beam paths 134 in a collimated arrangement, wherein the optical sensors 114 are aligned in parallel to the optical axis 114, thereby being individually displaced perpendicular to the optical axis 116 of the stereoscopic system 186. Herein, the collimated arrangement may, in particular, be achieved by employing a suitable number of the transfer devices 180 which are placed at the respective openings 120 of the housing 118 which comprises the optical detectors 114.

As described above, the tracking system 190 is adapted for tracking the position of one or more objects 112, in particular of at least one movable object 112, by using the first longitudinal optical sensor 188. For this purpose, the tracking system 190, thus, further comprises a track controller 198, wherein the track controller 198 is adapted to track a series of positions of the object 112. Herein, the track controller 198 may fully or partially be embodied as an electronic device, preferably as at least one data processing device, more preferably as at least one computer or microcontroller. The tracking system 186 may be adapted to initiate one or more actions of the tracking system itself and/or of one or more separate devices. For the latter purpose, the track controller 198 may have one or more wireless and/or wire-bound interfaces and/or other types of control connections for initiating at least one action in accordance with at least one actual position of the object. As a result, each position of the object 112 is related to at least one item of information on the longitudinal position of the object 112 at a specific point in time. In order to additionally acquire at least one item of information on the transversal position of the object 112, the sensor signals as recorded by the position sensitive device 196 may be taken into account. Alternatively, the first longitudinal optical sensor 188 may be part of a combined optical sensor as described elsewhere in this application.

As further described above, the scanning system 194 is adapted for determining the position of one or more objects 112. For this purpose, the scanning system 194, thus, further comprises at least one illumination source 200 which is adapted to emit at least one light beam 202 which is configured for an illumination of at least one dot 204 located at a surface 206 of the 112. In order to minimize an interaction between the optical sensors 114, the illumination source 200 may be located into the housing 118 or outside the housing 118 comprising the optical sensors 114. By way of example, the illumination source 200 may be or may comprise an ambient light source and/or may be or may comprise an artificial illumination source, in particular a laser source, an incandescent lamp, or a semiconductor light source, such as a light-emitting diode. Herein, the use of a single laser source is preferred, in particular to provide a compact stereoscopic system 188 being easily storable and transportable by a user. Thus, the scanning system 194 is designed to generate at least one item of information about a distance between the dot 204 and the scanning system 194 by using the second longitudinal optical sensor 192.

As a result, by applying a combination of visual information as derived from the first longitudinal optical sensor 188 and the second longitudinal optical sensor 192 which have overlapping fields of view into the direction of view 122, the stereoscopic system 198 may be able to generate or to increase a perception of depth information. For this purpose, the first longitudinal optical sensor 188 and the second longitudinal optical sensor 192 are, preferably, spaced apart from each other by a distance from 1 cm to 100 cm, in particular from 10 cm to 25 cm, in the direction perpendicular to the optical axis 116. Further, the first longitudinal optical sensor 188 and the second longitudinal optical sensor 192 may, preferably, be sensitive to an individual modulation frequency being provided by the modulation device 184, thus, allowing a straightforward distinction between the sensor signals of the two individual optical sensors 114 by using the evaluation device 164. Thus, the evaluation device 164 of the stereoscopic system 186 may be employed to generate one or more images of the object 112 by applying stereoscopic vision. Furthermore, the stereoscopic system 186 which is, primarily, based on the use of more than one of the optical sensors 114 may also be employed for achieving an increase of the total intensity and/or for obtaining a lower detection threshold.

For further details of the stereoscopic system 186, reference may be made to the description of the detector 110 in FIGS. 1 to 3.

LIST OF REFERENCE NUMBERS 110 detector
112 object
114 optical sensor
116 optical axis
118 housing
120 opening
122 direction of view
124 coordinate system
126 first electrode
128 second electrode
130 photovoltaic material
132 substrate
134 light beam
136 split electrode
138 sensor region
140 partial electrode
142 partial electrode
144 partial electrode
146 partial electrode
148 pair of partial electrodes
150 pair of partial electrodes
152 side of partial electrode
154 further side of partial electrode
156 side of partial electrode
158 side of partial electrode
160 gap
162 signal lead
164 evaluation device
166 transversal evaluation unit
168 longitudinal evaluation unit
170 evaluation unit
172 preamplifier
174 adder
176 subtractor
178 divider
180 transfer device
182 electro-wetting device
184 modulation device
186 stereoscopic system
188 first longitudinal optical sensor
190 tracking system
192 second longitudinal optical sensor
194 scanning system
196 position sensitive device
198 track controller
200 illumination source
202 emitted light beam
204 dot
206 surface

The invention claimed is:

1. A detector for optically determining a position of at least one object, comprising:

at least one optical sensor for determining a position of at least one light beam traveling from the object to the detector, wherein the optical sensor has at least a first electrode and a second electrode, wherein at least one photovoltaic material is embedded in between the first electrode and the second electrode, wherein the photovoltaic material is adapted to generate electric charges in response to an illumination of the photovoltaic material with light, wherein the first electrode or the second electrode is a split electrode having at least three partial electrodes, wherein each partial electrode is adapted to generate at least one sensor signal, wherein the sensor signal is dependent on a beam cross-section of the light beam in a sensor region of the optical sensor;

at least one evaluation device, wherein the evaluation device is designed to generate at least one item of information on a transversal position of the object, the transversal position being a position in at least one plane perpendicular an optical axis of the detector, by evaluating the sensor signal of pairs of the partial electrodes, and wherein the evaluation device is designed to generate at least one item of information on a longitudinal position of the object by evaluating a sum of the sensor signals of all partial electrodes.

2. The detector according to claim 1, wherein the optical sensor comprises at least one dye-sensitized solar cell.

3. The detector according to claim 2, wherein the optical sensor at least comprises the first electrode, at least one n-semiconducting metal oxide, at least one dye, at least one p-semiconducting organic material, and at least the second electrode.

4. The detector according to claim 3, wherein the first electrode is the split electrode, wherein the n-semiconducting metal oxide, the dye, the p-semiconducting organic material, and the second electrode are transparent.

5. The detector according to claim 4, wherein the first electrode is at least partially made of at least one conductive oxide, wherein the second electrode is at least partially made of a transparent electrically conductive polymer.

6. The detector according to claim 1, wherein the split electrode has two pairs of two partial electrodes, wherein two sides of each partial electrode adjoin one side of a further partial electrode.

7. The detector according to claim 1, wherein no gap remains between two adjacent partial electrodes.

8. The detector according to claim 7, wherein the two adjacent partial electrodes partially overlap each other, wherein an overlap area is created, wherein the overlap area is 1% or less than an area of each of the overlapping partial electrode.

9. The detector according to claim 1, wherein electrical currents through the partial electrodes are dependent on a position of the light beam in the sensor region, wherein the optical sensor is adapted to generate the sensor signal in accordance with the electrical currents through the partial electrodes.

10. The detector according to claim 1, wherein the evaluation device is designed to generate the item of information on the transversal position of the object, first, by forming sums of the sensor signals of pairs of adjacent partial electrodes located perpendicular to a selected direction within the plane, second, by forming at least one difference between the sums of the sensor signals of the pairs of the adjacent partial electrodes within the selected direction, and, third, by dividing the difference by the sum of the sensor signals of all partial electrodes.

11. The detector according to claim 1, wherein the evaluation device is designed to generate the at least one item of information on the longitudinal position of the object from at least one predefined relationship between the geometry of the illumination and a relative positioning of the object with respect to the detector.

12. The detector according to claim 11, wherein the evaluation device, in order to determine the at least one item of information on the longitudinal position of the object, is adapted to compare the diameter of the light beam with known beam properties of the light beam.

13. The detector according to claim 1, wherein the optical sensor exhibits a shape selected from a group comprising a planar, a planar-convex, a planar-concave, a biconvex, or a biconcave form.

14. The detector according to claim 1, wherein the detector further comprises at least one transfer device.

15. The detector according to claim 14, wherein the transfer device comprises at least one focus-tunable lens and/or an electro-wetting device.

16. The detector according to claim 1, furthermore comprising at least one illumination source.

17. The detector according to claim 1, wherein the optical sensor is furthermore designed in such a way that the sensor signal, given the same total power of the illumination, is dependent on a modulation frequency of a modulation of the illumination.

18. The detector according to claim 17, wherein the item of information on the transversal position of the object is separated from the item of information on the longitudinal position of the object by evaluating a frequency dependency of the sensor signals.

19. The detector according to claim 1, comprising at least two of the optical sensors, wherein the optical sensors are located in a collimated arrangement in a manner that they are aligned in an orientation parallel to the optical axis of the detector and exhibit an individual displacement in the orientation perpendicular to the optical axis of the detector.

20. A human-machine interface for exchanging at least one item of information between a user and a machine, wherein the human-machine interface comprises at least one detector according to claim 1, wherein the human-machine interface is designed to generate at least one item of geometrical information of the user with the detector wherein the human-machine interface is designed to assign to the geometrical information at least one item of information.

21. An entertainment device for carrying out at least one entertainment function, wherein the entertainment device comprises at least one human-machine interface according to claim 20, wherein the entertainment device is designed to enable at least one item of information to be input by a player with the human-machine interface, wherein the entertainment device is designed to vary the entertainment function in accordance with the information.

22. A tracking system for tracking the position of at least one movable object, the tracking system comprising at least one detector according to claim 1, the tracking system further comprising at least one track controller, wherein the track controller is adapted to track a series of positions of the object, each position comprising at least one item of information on a transversal position of the object at a specific point in time and at least one item of information on a longitudinal position of the object at a specific point in time.

23. A scanning system for determining at least one position of at least one object, the scanning system comprising at least one detector according to claim 1, the scanning system further comprising at least one illumination source adapted to emit at least one light beam configured for an illumination of at least one dot located at least one surface of the at least one object, wherein the scanning system is designed to generate at least one item of information about the distance between the at least one dot and the scanning system by using the at least one detector.

24. A stereoscopic system comprising at least one tracking system, wherein the tracking system and the scanning system each comprise at least one optical sensor which are located in a collimated arrangement in a manner that they are aligned in an orientation parallel to the optical axis of the stereoscopic system and exhibit an individual displacement in the orientation perpendicular to the optical axis of the stereoscopic system, wherein each of the tracking system and the scanning system comprises at least one detector according to claim 1.

25. A camera for imaging at least one object, the camera comprising at least one detector according to claim 1.

26. A method for optically determining a position of at least one object, the method comprising:

determining a position of at least one light beam with at least one optical sensor Wherein, during said determining, the optical sensor determines a position of at least one light beam traveling from the object to the detector, wherein the optical sensor has at least a first electrode and a second electrode, wherein at least one photovoltaic material is embedded in between the first electrode and the second electrode, wherein the photovoltaic material is adapted to generate electric charges in response to an illumination of the photovoltaic material with light, wherein the first electrode or the second electrode is a split electrode having at least three partial electrodes, wherein each partial electrode is adapted to generate at least one sensor signal, wherein the sensor signal is dependent on a beam cross-section of the light beam in a sensor region of the optical sensor; and generating at least one item of information, wherein, during said generating, at least one evaluation device generates at least one item of information on a transversal position of the object, the transversal position being a position in at least one plane perpendicular an optical axis of the detector, by evaluating the sensor signal of pairs of the partial electrodes, and wherein the evaluation device further generates at least one item of information on a longitudinal position of the object by evaluating a sum of the sensor signals of all partial electrodes.

* * * * *

UNITED STATES PATENT AND TRADEMARK OFFICE
CERTIFICATE OF CORRECTION

PATENT NO. : 10,094,927 B2  
APPLICATION NO. : 15/514830  
DATED : October 9, 2018  
INVENTOR(S) : Robert Send et al.

Page 1 of 1

It is certified that error appears in the above-identified patent and that said Letters Patent is hereby corrected as shown below:

On the Title Page

Page 4, Item (56), Column 2, Line 41, "microiens" should read --microlens--.

Page 5, Item (56), Column 1, Line 44, "Manfacturers" should read --Manufacturers--;

Page 5, Item (56), Column 1, Line 64, "Engish" should read --English--.

In the Specification

Column 7, Line 35, "area with as least" should read --area with at least--.

In the Claims

Column 47, Claim 26, Line 7, "Wherein, during" should read --wherein, during--.

Signed and Sealed this  
Eighth Day of October, 2019

Andrei Iancu  
*Director of the United States Patent and Trademark Office*